United States Patent
Barbulescu et al.

(10) Patent No.: US 9,567,746 B1
(45) Date of Patent: Feb. 14, 2017

(54) CURTAIN WALL SYSTEM WITH ANTI-ROLLING SHEAR BLOCK

(71) Applicant: Alcoa Inc., Pittsburgh, PA (US)

(72) Inventors: Ion-Horatiu Barbulescu, Atlanta, GA (US); William J. Hooper, Lawrenceville, GA (US); Christopher R. Hartwell, Suwanee, GA (US)

(73) Assignee: Arconic Inc., Pittsburgh, PA (US)

( * ) Notice: Subject to any disclaimer, the term of this patent is extended or adjusted under 35 U.S.C. 154(b) by 0 days.

(21) Appl. No.: 14/884,319

(22) Filed: Oct. 15, 2015

(51) Int. Cl.
*E04B 2/96* (2006.01)
*H02G 3/38* (2006.01)

(52) U.S. Cl.
CPC ............... *E04B 2/965* (2013.01); *E04B 2/967* (2013.01); *H02G 3/388* (2013.01)

(58) Field of Classification Search
None
See application file for complete search history.

(56) References Cited

U.S. PATENT DOCUMENTS

| | | | | |
|---|---|---|---|---|
| 3,561,801 A | * | 2/1971 | Chiu | F16B 7/0446 403/264 |
| 3,772,837 A | * | 11/1973 | Hunt | E04B 2/766 256/65.01 |
| 3,940,897 A | * | 3/1976 | Stoakes | E04B 2/60 52/204.591 |
| 4,031,680 A | * | 6/1977 | Stoakes | E04B 2/965 52/204.597 |
| 4,584,804 A | * | 4/1986 | Tajima | E04B 2/7863 52/209 |
| 4,707,959 A | * | 11/1987 | Stoakes | E04B 2/965 52/235 |
| 5,067,293 A | * | 11/1991 | Reynolds | E04B 2/965 52/235 |
| 5,107,647 A | * | 4/1992 | Danielewicz | E04B 1/0046 52/204.597 |
| 5,307,597 A | * | 5/1994 | Tanikawa | E06B 7/14 52/235 |
| 5,481,839 A | * | 1/1996 | Lang | E04B 2/967 52/235 |
| 5,546,718 A | * | 8/1996 | Way | E04B 2/7448 160/135 |
| 5,771,640 A | * | 6/1998 | Back | E04B 1/0046 52/204.7 |
| 5,839,236 A | * | 11/1998 | Frey | E04B 2/965 52/235 |

(Continued)

OTHER PUBLICATIONS

1600 Wall System (TM) Curtain Wall Features, Jun. 2015 EC 97911-075.

*Primary Examiner* — Rodney Mintz
(74) *Attorney, Agent, or Firm* — Greenberg Traurig, LLP

(57) ABSTRACT

A curtain wall has a plurality of hollow, extruded vertical and horizontal members. The members have a pair of spaced retainer walls which engage a shear block with a pair of tabs that twist locks onto the retainer walls before fastening the block to the member. A second member slips over the block and is fastened by screws. The abutment of the tabs limits rotation of the block and attached member, providing support for a glazing panel attached to the members. The members have longitudinal recesses accommodating wiring that may be covered with a cover. A bracket interacting with the retainer walls like a shear block may also be used.

27 Claims, 12 Drawing Sheets

(56) References Cited

U.S. PATENT DOCUMENTS

| | | | | |
|---|---|---|---|---|
| 6,226,940 B1* | 5/2001 | Biebuyck | ............... | E04B 2/962 52/235 |
| 7,752,818 B1* | 7/2010 | Roegge | ............... | E04F 13/0814 52/235 |
| 8,800,221 B1* | 8/2014 | Header | ............... | E04B 2/88 52/204.5 |
| 2003/0226324 A1* | 12/2003 | Hogan | ............... | E04B 2/96 52/235 |
| 2004/0031220 A1* | 2/2004 | Hocker | ............... | E04B 2/965 52/235 |
| 2004/0079038 A1* | 4/2004 | Crooker, Jr. | ............... | E04B 2/96 52/235 |
| 2005/0284053 A1* | 12/2005 | Grunewald | ............... | E04B 2/96 52/235 |
| 2006/0016137 A1* | 1/2006 | Ferro | ............... | E04B 2/965 52/235 |
| 2006/0080917 A1* | 4/2006 | Hall | ............... | E04B 2/965 52/235 |
| 2006/0201084 A1* | 9/2006 | Arias | ............... | E04B 2/965 52/235 |
| 2007/0094955 A1* | 5/2007 | Safford | ............... | E04B 2/885 52/204.5 |
| 2011/0138727 A1* | 6/2011 | Labrecque | ............... | E04B 2/965 52/483.1 |
| 2012/0210664 A1* | 8/2012 | Lang | ............... | E04B 2/965 52/407.2 |
| 2014/0075868 A1* | 3/2014 | Kerley | ............... | E05B 65/006 52/238.1 |
| 2014/0090319 A1* | 4/2014 | Swartz | ............... | E04B 2/967 52/235 |

* cited by examiner

CURTAIN WALL SYSTEM WITH ANTI-ROLLING SHEAR BLOCK

FIELD

The present invention relates to structures for buildings and more particularly to members and manufactures for making window structures, such as curtain walls, methods and apparatus for managing electrical wiring in window structures, as well as, apparatus and methods for attaching devices to window structures.

BACKGROUND

Curtain walls typically include a plurality of glazing panels (windows made of glass or plastic) supported in a framework of vertical and horizontal structural elements. Some known curtain walls utilize shear blocks to attach a horizontal structural element (mullion) to a vertical structural element (mullion), e.g., a curtain wall manufactured by Kawneer/Alcoa of Norcross, Ga. known as 1600 has such features. Shear blocks can roll/twist if the weight of the glazing unit or other load supported by the horizontal mullion exceeds the capacity of the shear blocks, causing the integrity of the curtain wall/glazing unit to be compromised. This may happen, e.g., if a curtain wall designed for single glazed glazing panels or double glazing is fitted with triple glazed glazing panels or if an overload is placed on the mullion through accident or misuse.

Another attribute of curtain walls is that they are increasingly being used as a support for installed devices and structures, such as sunshades, light shelves, canopies, etc. These devices may be attached with brackets and fasteners, such as screws, to a surface of the horizontal or vertical members of a curtain wall, e.g., the front face of a mullion. The weight of such installed devices must be controlled so as not to exceed the pullout values of the fasteners extending into the curtain wall. In addition, if a given device is removed or repositioned, the mounting holes used by the fasteners remain in the curtain wall surface compromising the appearance and integrity of the curtain wall.

The devices installed on curtain walls include those that use or generate electricity and therefore have attendant wiring to and from associated circuits inside and/or outside the building on which the curtain wall is present. For example, signage, power generating devices, such as solar panels, power generating windmills, sunshades and light shelves may be attached to a curtain wall façade. In addition, buildings increasingly utilize sensors, lighting devices, surveillance and communication devices, such as antennas, that require associated wiring. Wiring on, in or through a curtain wall presents challenges, in that drilling through mullions weakens them and degrades weather intrusion resistance. The wiring or electrical conduit is unsightly and it is difficult to route wiring through the interior hollows of curtain walls, as this typically requires pushing or pulling wire through elongated hidden channels, which may have constrictions and hidden obstacles. The wiring of devices mounted on or near a curtain wall is typically done after installation of the device to be wired. Once installed on, in or through a curtain wall, it is difficult to trace a specific wire to remove or replace it. Alternative curtain wall systems therefore remain desirable.

SUMMARY

The disclosed subject matter relates to a structure having a first member with a portion having a C-shaped cross-sectional shape and a pair of retainer walls, a first of the pair of retainer walls attached at a first end of the C-shaped portion and extending at an angle relative thereto, a second of the pair of retainer walls attached at a second end of the C-shaped portion and extending at an angle relative thereto; a shear block with a base portion having a pair of opposed tabs extending therefrom, the tabs separated from a remainder of the base portion by reliefs, a connector portion extending from the base portion, each relief accommodating a corresponding retainer wall of the pair of retainer walls, capturing the corresponding retainer wall between the tab and the remainder of the base portion, coupling the shear block to the first member; and a second member having a hollow therein, the connector portion of the shear block matingly received in the hollow.

In another embodiment, the retainer walls extend toward one another and the shear block is fastened to the first member by fasteners.

In another embodiment, the shear block is fastened to the second member by fasteners extending through the second member into the shear block.

In another embodiment, at least one of the tabs abut against a portion of the C cross-sectional shape when the shear block is rotated to a selected position relative to the first member, preventing further rotation.

In another embodiment, the first member has a length, a width and a thickness, the length dimension having a vertical component, the shear block having a width, a thickness and a length, the length direction of the shear block extending away from the first member, the width of the shear block having a horizontal component and the selected position is with the width dimension of the shear block at about 90 degrees relative to the length of the first member.

In another embodiment, the first member is approximately vertical and the second member is approximately horizontal.

In another embodiment, the base portion of the shear block abuts against the first member at an intermediate portion of the C-shape, the base portion having a channel between the tabs.

In another embodiment, a wire extends through the channel.

In another embodiment, the connector portion is hollow having a pair of side walls extending from the base portion to a top wall distal to the base portion.

In another embodiment, the connector portion has at least one intermediate wall positioned between the side walls and extending between the base portion and the top wall.

In another embodiment, the first member has a pair of oppositely directed C-shaped portions.

In another embodiment, the second member has a glazing support tongue, the structure supporting at least one glazing panel.

In another embodiment, the structure has a plurality of first members, a plurality of second members and a plurality of shear blocks, the first members and second members being mullions for a window system.

In another embodiment, the oppositely directed C-shaped portions of the first member are spaced apart and further comprising a first cap connected to a first end of each C-shape, bridging the spaced C-shapes and a second cap connected to a second end of each C-shape, bridging the spaced C-shapes, forming a hollow I-shaped structure in cross-section.

In another embodiment, the I-shaped first member has at least one internal strengthening rib positioned within the hollow thereof.

In another embodiment, the cross-sectional shape of the second member approximates the cross-sectional shape of the first member.

In another embodiment, the I-shaped structure has at least two internal strengthening ribs defining the shape of the hollow that matingly receives the connector portion of the shear block.

In another embodiment, the structure has an electrical conductor element extending through at least one of the C-shapes in at least one of the first or second members.

In another embodiment, the electrical conductor element extends through the C-shapes of both the first and second members.

In another embodiment, the cross-sectional shape of the second member approximates the cross-sectional shape of the first member and further comprising a cover bridging the corresponding C-shape and removably attached to at least one of the first or second members.

In another embodiment, the cover has at least one resilient leg that grips the first or second member to establish a snap fit.

In another embodiment, the structure has a mounting bracket with a base portion having a pair of opposed tabs extending therefrom, the tabs separated from a remainder of the base portion by reliefs, and a bracket portion extending from the base portion, each relief of the mounting bracket accommodating a corresponding retainer wall of the pair of retainer walls, capturing the corresponding retainer wall between the tab thereof and the remainder of the base portion thereof, coupling the mounting bracket to the first member.

In another embodiment, the retainer walls of the first member extend toward one another and the shear block is fastened to the first member by fasteners and wherein at least one of the tabs of the mounting bracket base portion abut against a portion of the C cross-sectional shape when the shear block is rotated to a selected position relative to the first member, preventing further rotation.

In another embodiment, each of the tabs is relieved on at least one edge thereof.

In another embodiment, a structure has a first member and a second member each having a pair of oppositely directed C-shaped portions having a C-shaped cross-sectional shape and a pair of retainer walls, a first of the pair of retainer walls attached at a first end of each C-shaped portion and extending at an angle relative thereto, a second of the pair of retainer walls attached at a second end of each C-shaped portion and extending at an angle relative thereto, the retainer walls extending toward one another, the oppositely directed C-shaped portions of the first member being spaced apart with a first cap structure connected to a first end of each C-shape, bridging the spaced C-shapes and a second cap structure connected to a second end of each C-shape, bridging the spaced C-shapes, forming a hollow I-shaped structure in cross-section, each of the first member and the second member having a glazing support tongue, the structure supporting at least one glazing panel; a shear block with a base portion having a pair of opposed tabs extending therefrom, the tabs separated from a remainder of the base portion by reliefs, a connector portion extending from the base portion, each relief accommodating a corresponding retainer wall of the pair of retainer walls, capturing the corresponding retainer wall between the tab and the remainder of the base portion, coupling the shear block to the first member, the shear block fastened to the first member by fasteners, the hollow of the second member receiving the connector portion of the shear block matingly therein, the shear block fastened to the second member by fasteners extending through the second member into the shear block.

In another embodiment, the structure has an electrical wire passing through one of the C-shaped portions and a cover bridging one of the C-shaped portions removably attached to at least one of the first member or the second member.

In another embodiment, the structure has a plurality of first members, a plurality of second members and a plurality of shear blocks, the first members and second members forming mullions for a curtain wall window system.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Figure 1:
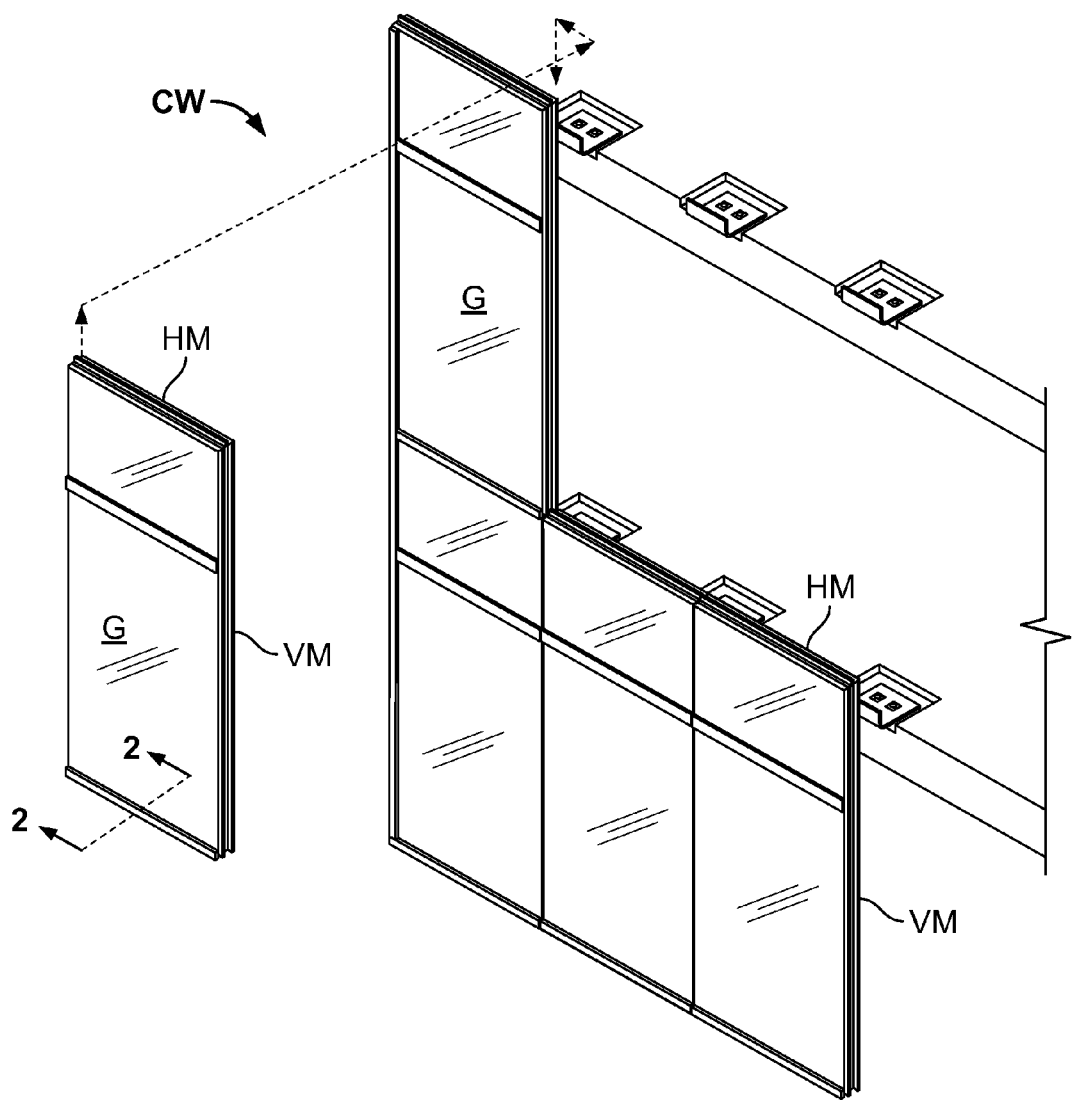
FIG. 1 is exploded, perspective view of a curtain wall in accordance with the prior art.
Figure 2:
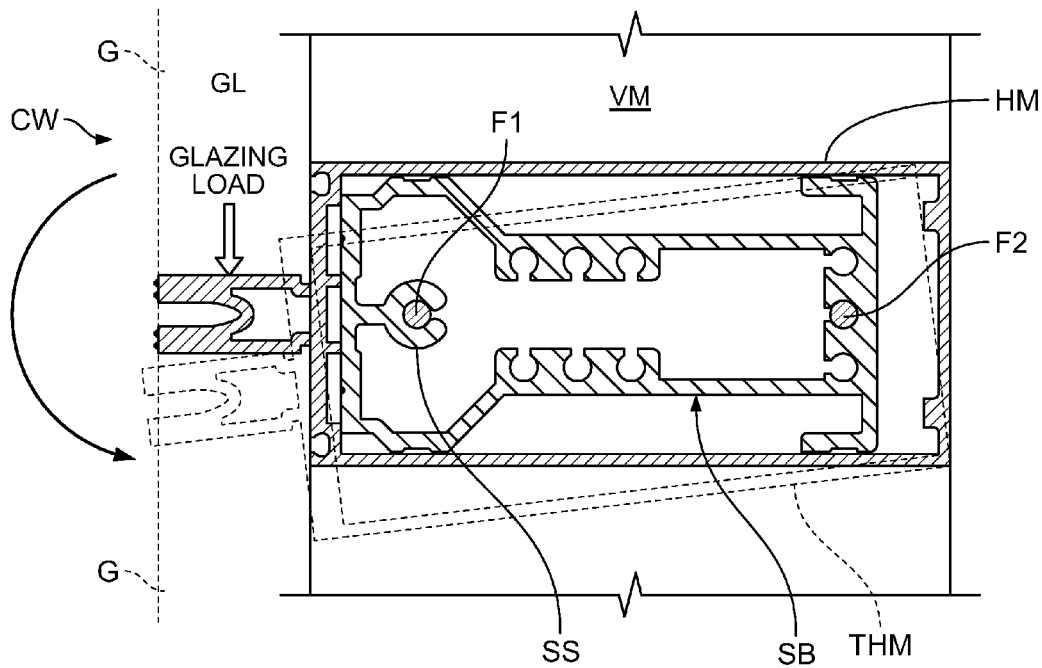
FIG. 2 is a cross-sectional view of a horizontal member shown in FIG. 1, taken along section line 2-2 and looking in the direction of the arrows.

FIGS. 1 and 2 show a prior art curtain wall structure CW that utilizes shear blocks SB to attach horizontal mullions HM to vertical mullions VM. The shear blocks SB can roll/twist if the weight of the glazing unit G (glazing load GL) supported by the horizontal mullion HM exceeds the capacity of the shear blocks SB, causing the integrity of the curtain wall CW to be compromised. The shear blocks SB may also twist if the horizontal mullions HM are overloaded by an accident or misuse, e.g., being hit by a flying object during a storm or overloaded by an inappropriately installed sign or solar panel. FIG. 2 illustrates a twisted horizontal mullion THM depicted in dotted lines) that has been twisted by eccentric over-loading of the horizontal mullion HM and resultant strain on a prior art shear block SB. In one example, a support structure SS held by fastener F1 may bend, allowing the shear block SB to pivot down on fastener F2. This type of strain on a shear block SB and subsequent movement of a glazing support structure HM (horizontal mullion) can lead to the failure of the curtain wall CW in whole or part.

Figure 3:
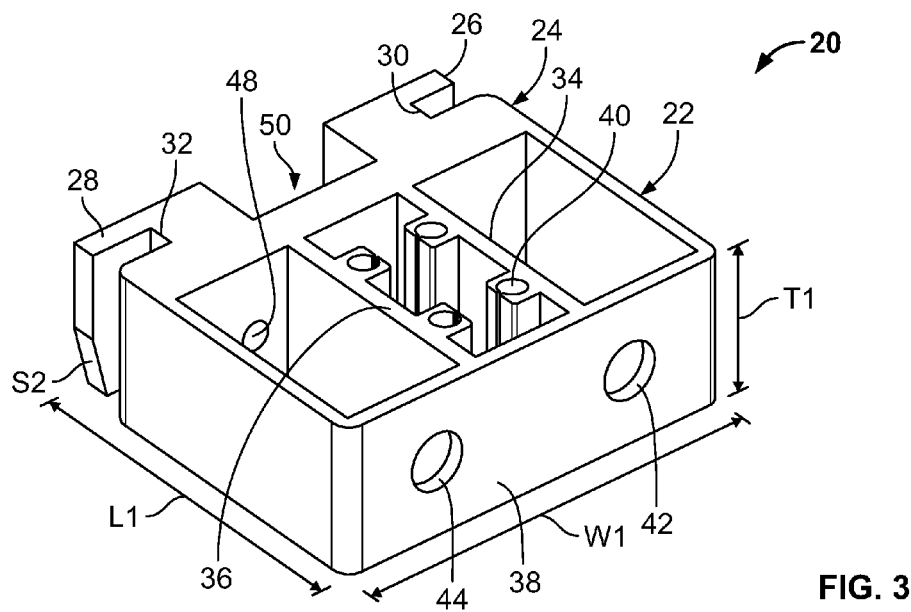
FIG. 3 is a perspective view of a shear block in accordance with an embodiment of the present disclosure.
Figure 4:
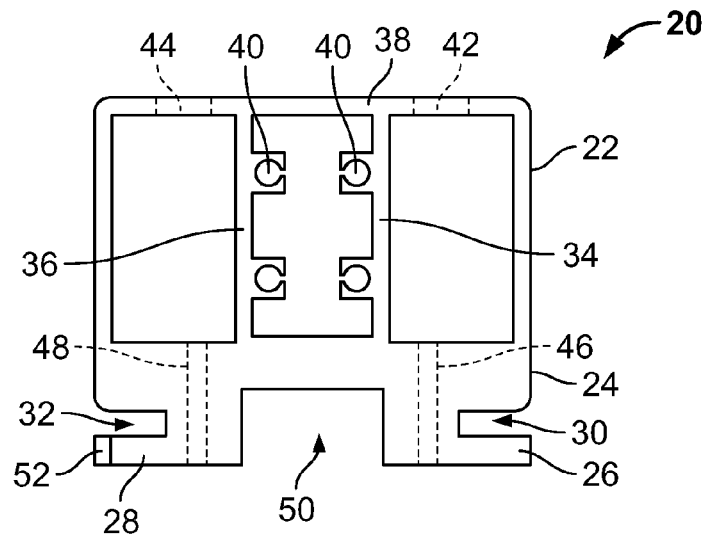
FIG. 4 is a plan view of the shear block of FIG. 3.
Figure 5:
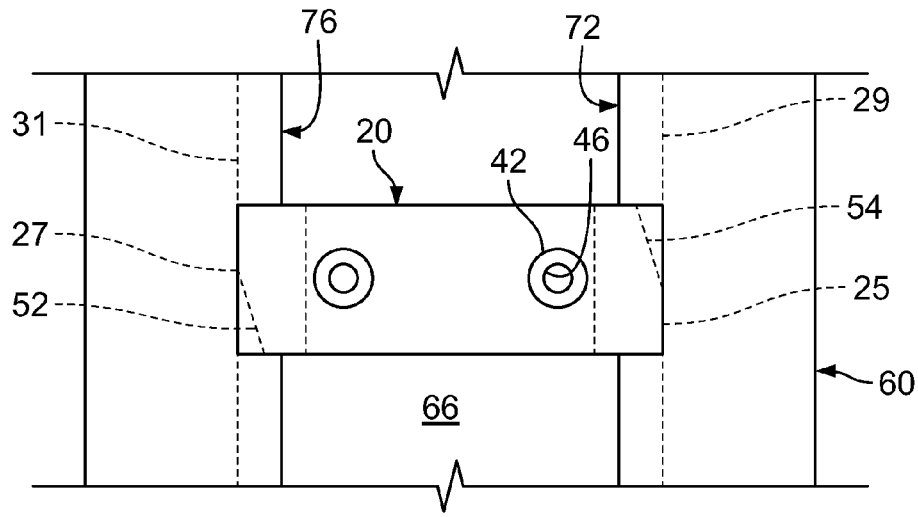
FIG. 5 is a front view of the shear block of FIGS. 3 and 4 installed on a structural member.

FIGS. 3, 4, 5 and 6 show a shear block 20 in accordance with the present disclosure, which has a connector portion 22 and a base portion 24. The base portion 24 features a pair of opposed engagement tabs 26 and 28 defined by reliefs 30, 32. The connector portion 22 is generally hollow, but has a pair of members 34, 36 that extend from the base 24 to the top wall 38 of the connector portion 22. Each member 34, 36 has a pair of fastener apertures 40 that may receive, e.g., a bolt, screw, rivet or other fastener for fastening the shear block 20 to a structural member, e.g., 60 (FIG. 5). Apertures 42, 44 extend through the top wall 38 and are coaxially aligned with shank apertures 46, 48 that extend through the base 24, allowing passage of a screw or bolt to extend there through to secure the shear block 20 to a structural member, e.g., 60. A wire channel 50 in the base 24 allows wires to pass between the shear block 20 and a surface on which the shear block 20 is mounted, e.g., a structural member 60. The tabs 26, 28 have reliefs 52, 54 on at least one edge, allowing the shear block to be rotated into position, as described below. As shown in FIG. 5, the shear block 20 may be rotated relative to the structural member 60, such that tabs 26, 28 engage the retainer walls/tracks 72, 76 on the structural member 60 and outer surfaces 25, 27 of the tabs 26, 28 abut against constraining walls 29, 31 that define the recesses 80, 86 between the retainer walls 72, 76 and the web 66 (see FIG. 8). These mechanical interactions are explained further below. FIG. 3 shows the shear block 20 has a length L1 a width W1 and a thickness T1.

Figure 7:
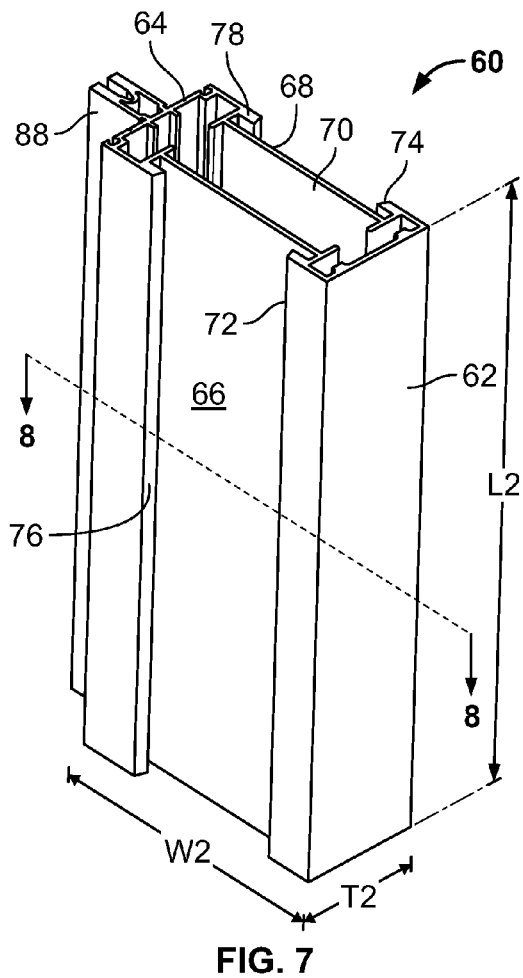
FIG. 7 is a perspective view of the structural member of FIG. 5.
Figure 8:
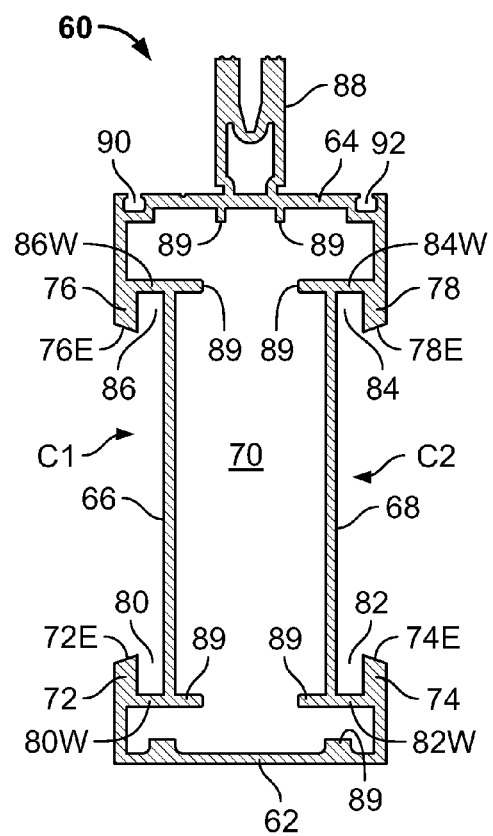
FIG. 8 is a cross sectional view of the structural member of FIG. 7 taken along section line 8-8 and looking in the direction of the arrows.

FIGS. 7 and 8 show a structural member 60 which may be oriented in any given orientation, e.g., vertically (as shown) or horizontally (See FIG. 14) and may function as a mullion in a window system, e.g., in a curtain wall. The structural member 60 has a pair of side caps 62, 64 conjoined to a pair of opposed webs 66, 68 with a space 70 between the webs 66, 68. Retainer walls 72, 74, 76, 78 extend from the side caps 62, 64 along the length of the structural member 60, forming opposing pairs 72, 76 and 74, 78. The retainer walls 72, 74, 76, 78 are spaced from the webs 66, 68 by recesses 80, 82, 84, 86 defined by walls 80W, 82W, 84W, 86W. The retainer walls 72, 74, 76, 78 may have tapered ends 72E, 74E, 76E, 78E that serve as lead-in surfaces for resilient legs 130A, 130B of a cover 130 (See FIGS. 22 and 23) that clip over the internal edges of the tapered ends 72E, 74E, 76E, 78E. Two shallow, "squared"/angular C-shapes C1, C2 are defined in cross-section by web 66 and walls 80W and 86W and by web 68 and walls 82W and 84W. Retainer walls 72, 76 extend from the ends of C-shape C1 and retainer walls 74, 78 extend from the ends of C-shape C2. The C-shapes C1, C2 are held in spaced relationship by caps 62, 64 that bridge the C-shapes, yielding a structural member 60 with a generally I-shaped cross-sectional shape. In an alternative to that shown, the caps 62, 64 may be flat plates that abut the upper and lower portions of the C-shapes C1, C2. A glazing panel support tongue 88 extends from the cap 64 along the length of the support member 60 and functions as a lip upon which a glazing panel (not shown) may rest, as well as an attachment structure for a cover element (not shown) for covering the edge of the glazing panel. The structural member 60 has a plurality of strengthening ribs 89, which contribute to the rigidity and strength of the structural member 60. Gasket recesses 90, 92 are provided to receive gaskets (not shown) that may aid in forming a seal with a glazing unit (not shown). As shown, the structural member may be formed as a monolith, e.g., as an aluminum alloy extrusion. The structural member 60 has a length L2, a width W2 and a thickness T2.

Figure 9:
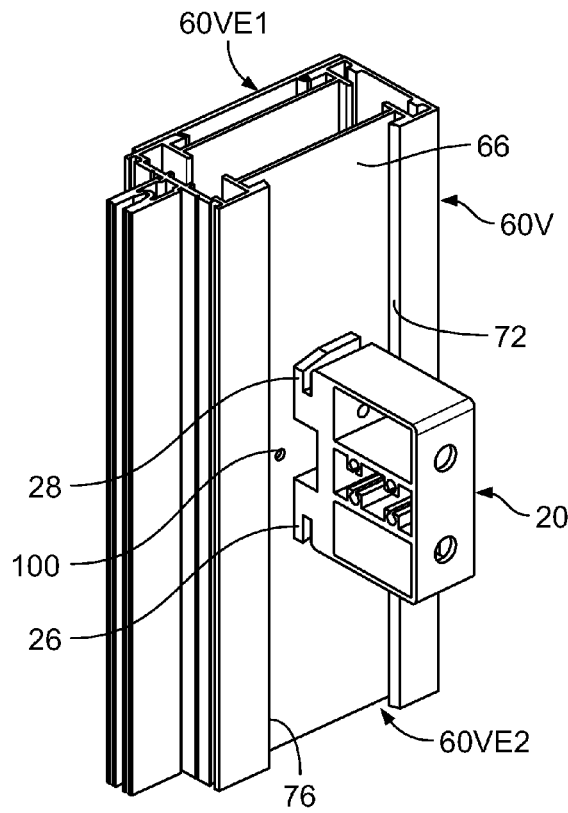
FIGS. 9-13 are a series of perspective views of a sequence of positions of the shear block of FIGS. 3-6 in the course of assembling the shear block to the structural member of FIGS. 7 and 8.
Figure 10:
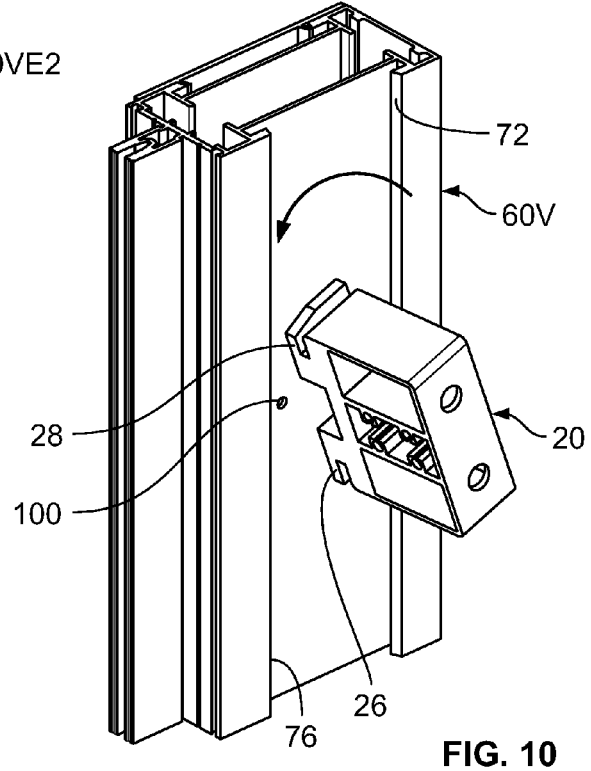
Figure 11:
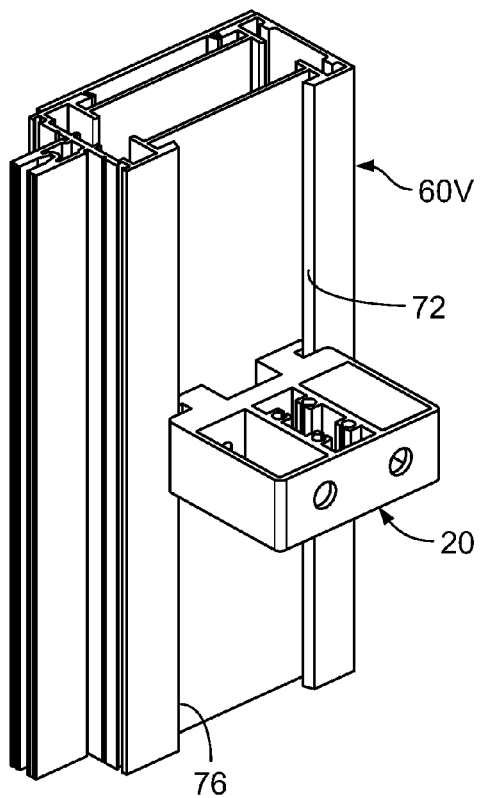
Figure 12:
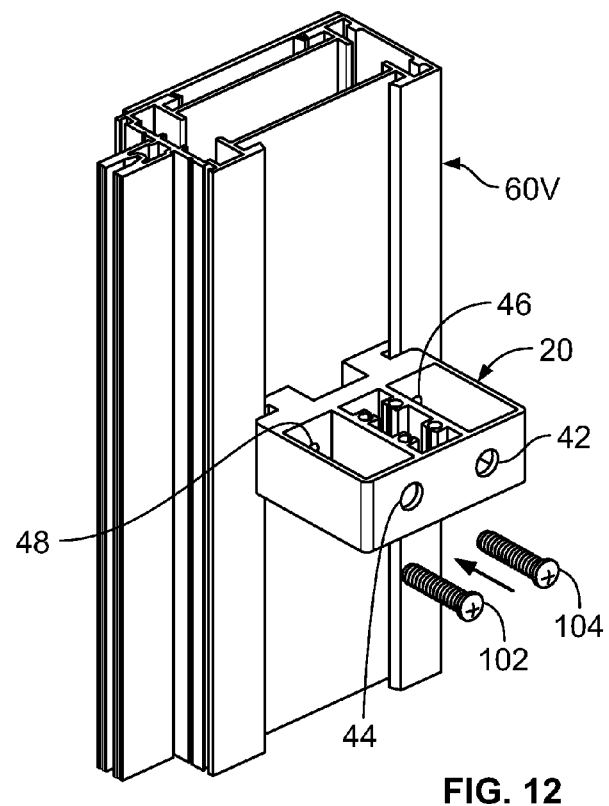

FIGS. 9-16 show steps that may be used to assemble a structure 200 (FIG. 16) having structural members 60V and 60H assembled at right angles. In FIG. 9, a shear block 20 having the attributes shown in FIGS. 3-6 is positioned with the tabs 26, 28 proximate a vertically oriented structural member 60V having the attributes shown in FIGS. 7 and 8. The tabs 28, 26 are oriented up and down, allowing insertion between retainer walls 72, 76 and placement against web 66. The web 66 has a pair of holes 100 (only one visible in FIG. 9) that may be used to receive and retain screws 102, 104 (FIG. 12). FIG. 10 shows the shear block 20 being rotated counterclockwise such that the tabs 26, 28 slip behind the retainer walls 72, 76, the retainer walls 72, 76 being received within the recesses 30, 32 (See FIG. 4). The reliefs 52, 54 (FIG. 5) on the tabs 26, 28 facilitate rotation of the shear block 20, allowing a close fit of the shear block 20 within the constraining walls 29, 31 (FIG. 5), with the outer surfaces 25, 27 of the tabs 26, 28 abutting against the constraining walls 29, 31. This positions the shear block 20 at a preselected orientation, e.g., perpendicular to the length of structural member 60V and prevents further rotation. This occurs when the shear block 20 is rotated to a horizontal orientation with the tabs 26, 28 extending right and left. This could be described as a "twist and lock" relationship. In an alternative method of assembly, the shear block 20 may be held in an orientation approximately perpendicular to the structural member 60V and then the tabs 26, 28 inserted into the slot formed by opposing retainer walls, e.g., 72, 76 and spaced web 66, at one of the ends 60VE1, 60VE2 (FIG. 9) of the structural member 60V. The shear block 20 may then be slid along the structural member 60V to a selected position along its length and then secured at that position by threaded fasteners. This second approach could be described as a "sliding" interaction for assembling the shear block 20 to the structural member 60V.

FIG. 11 shows the shear block 20 in a horizontal position, which corresponds to the position also shown in FIG. 5.

FIG. 12 shows that the horizontal position of the shear block in FIG. 11 may also allow the holes 100 (FIGS. 9 and 10) to align with the apertures 42, 44, 46, 48 allowing the passage of fasteners, e.g., screws 102, 104 there through for insertion into and attachment to holes 100 in the structural member 60V. When secured in the position shown in FIG. 13, the shear block 20 resists rotation, in particular, in a counterclockwise direction, due to fasteners 102, 104, but also due to the abutment of surfaces 25 and 27 with the constraining walls 29, 31, as shown in FIG. 5.

Figure 14:
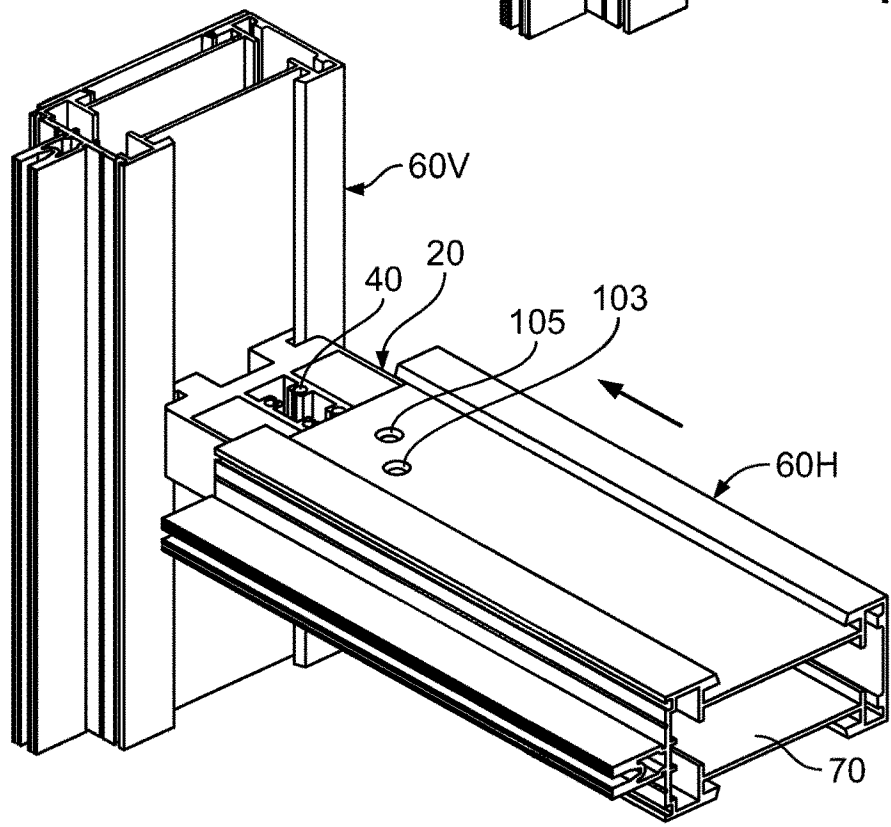
Figure 15:
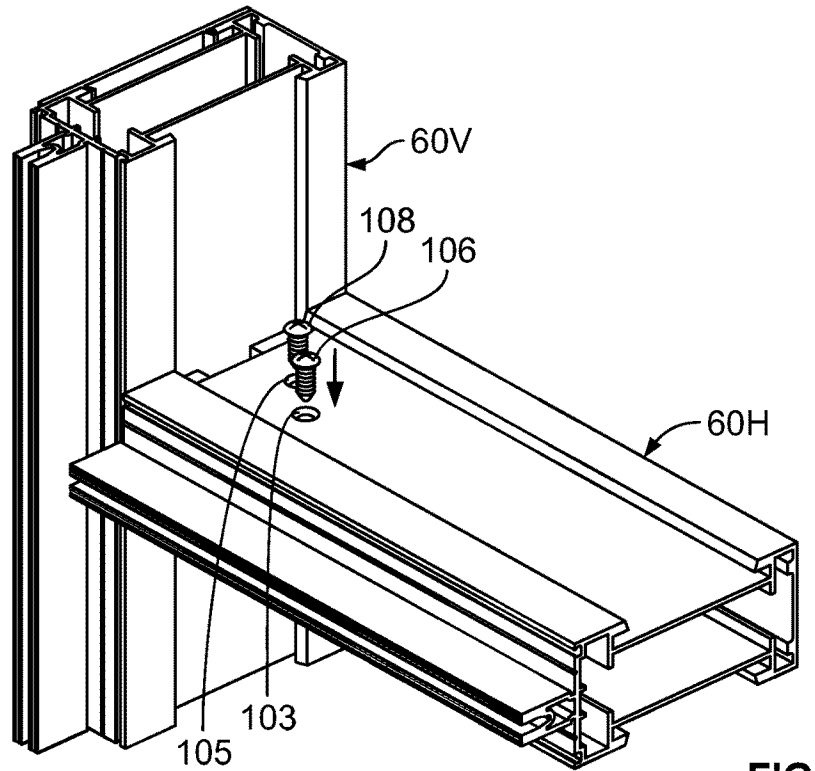
Figure 16:
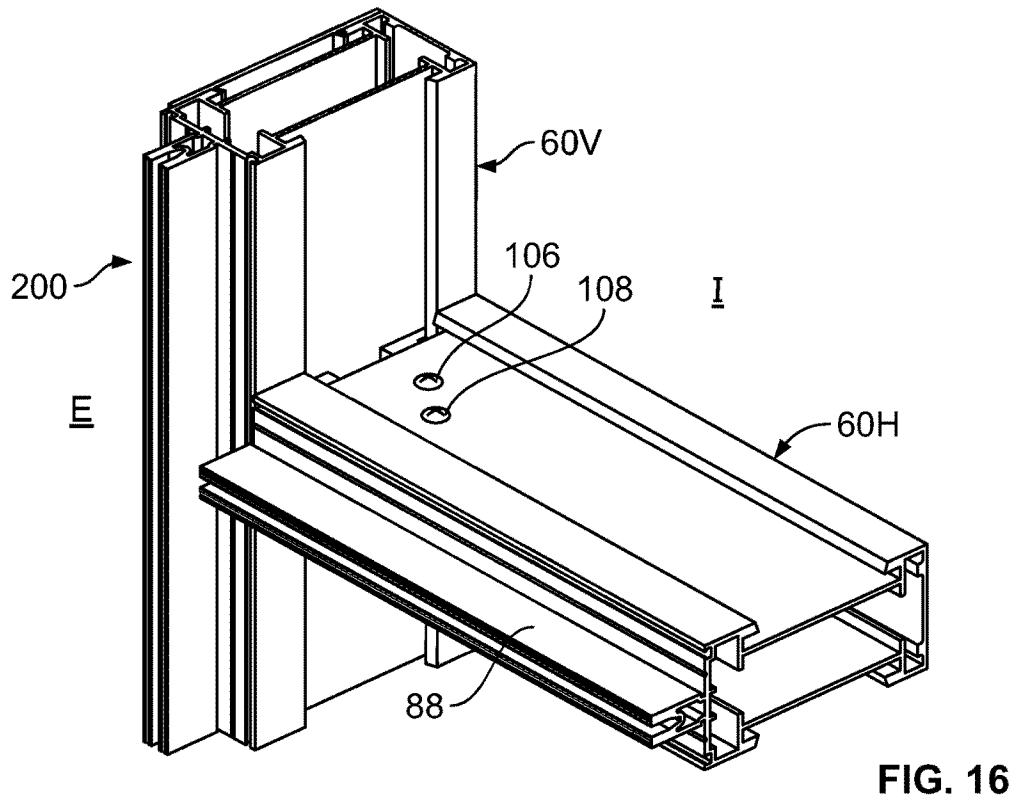
Figure 17:
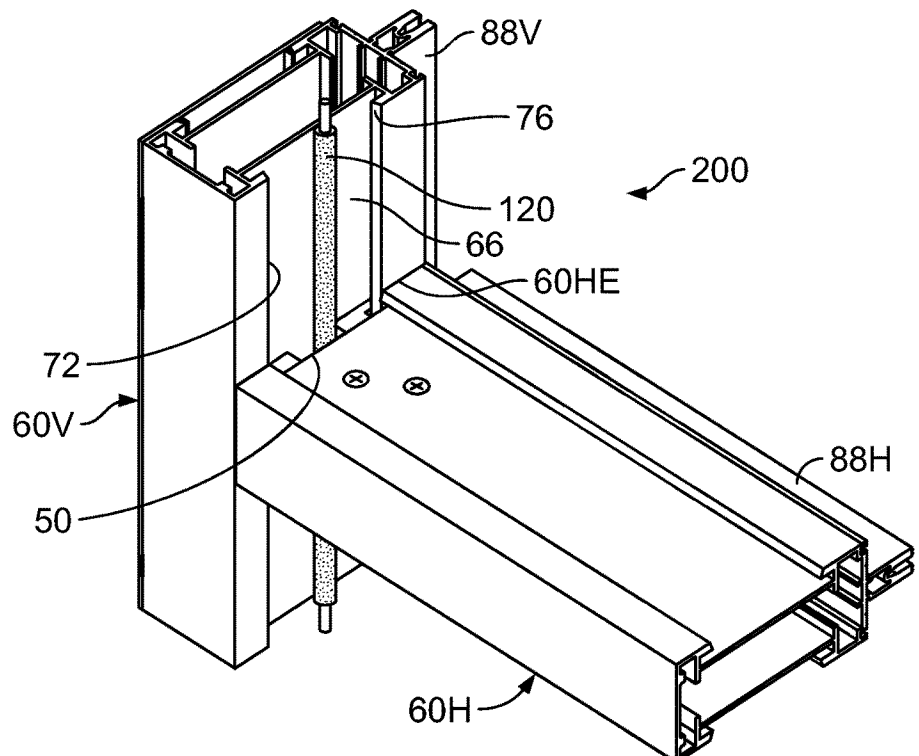
Figure 18:
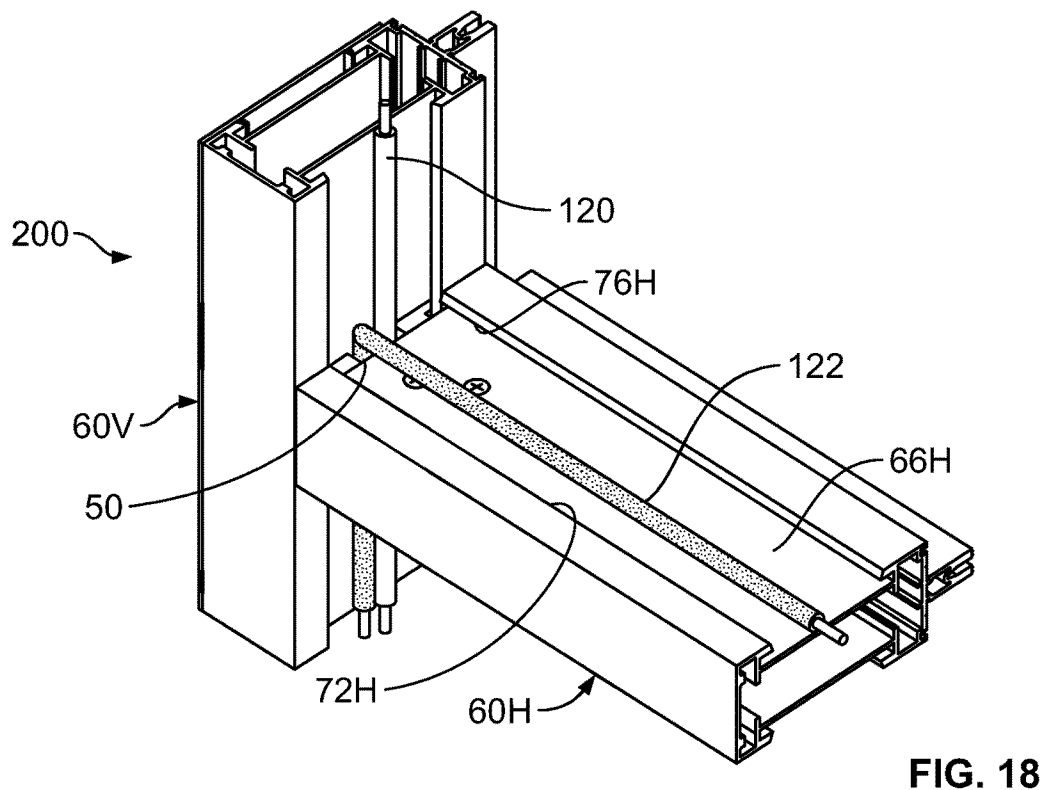
Figure 19:
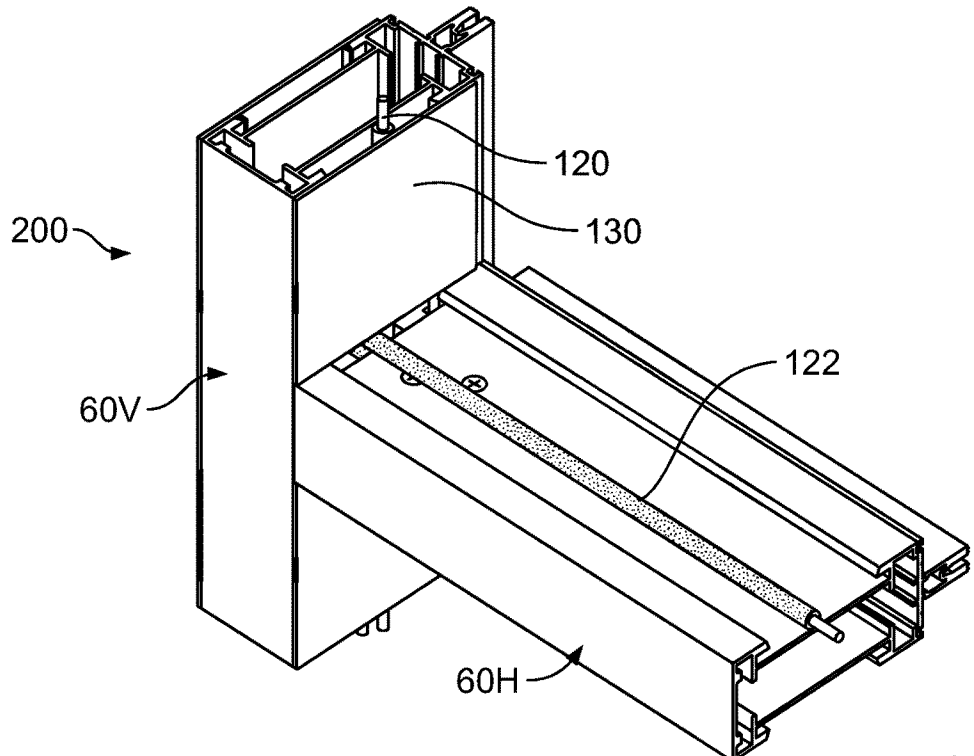
Figure 20:
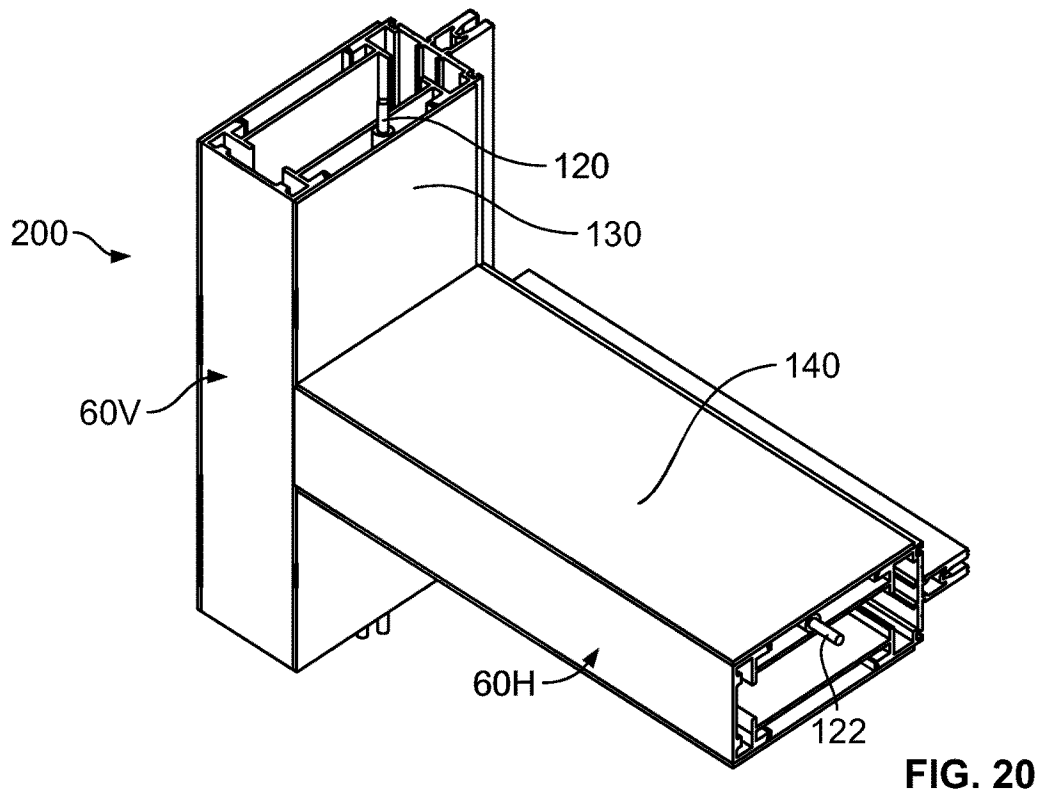
Figure 21:
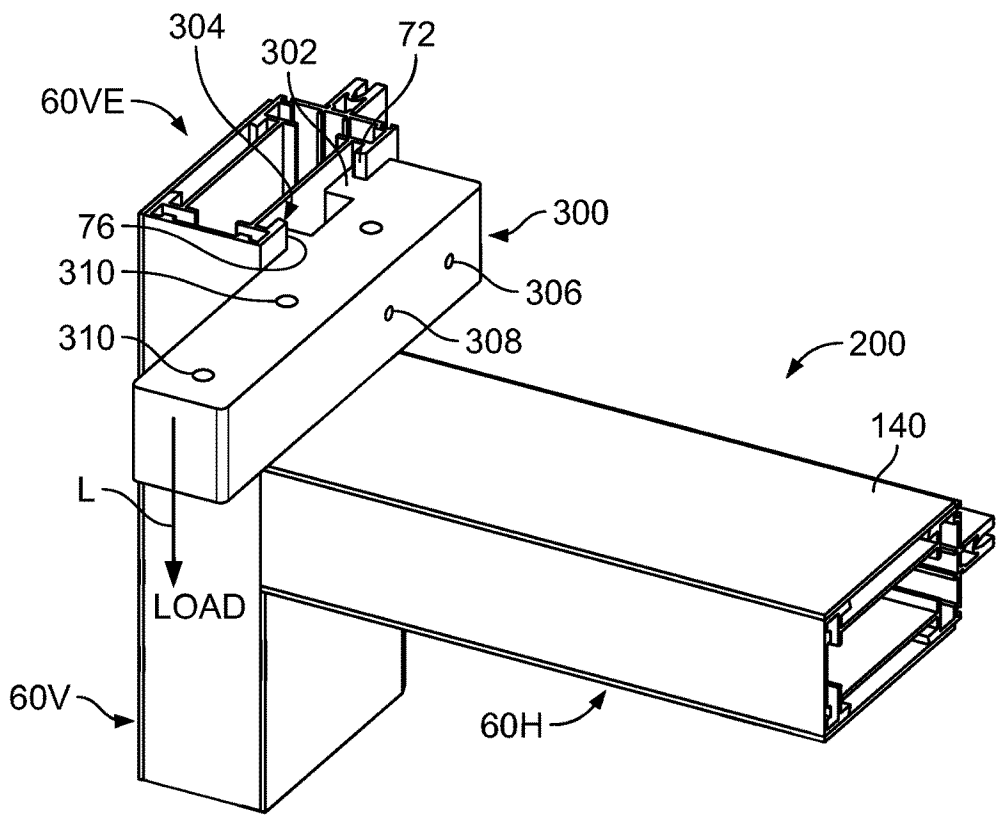
Figure 22:
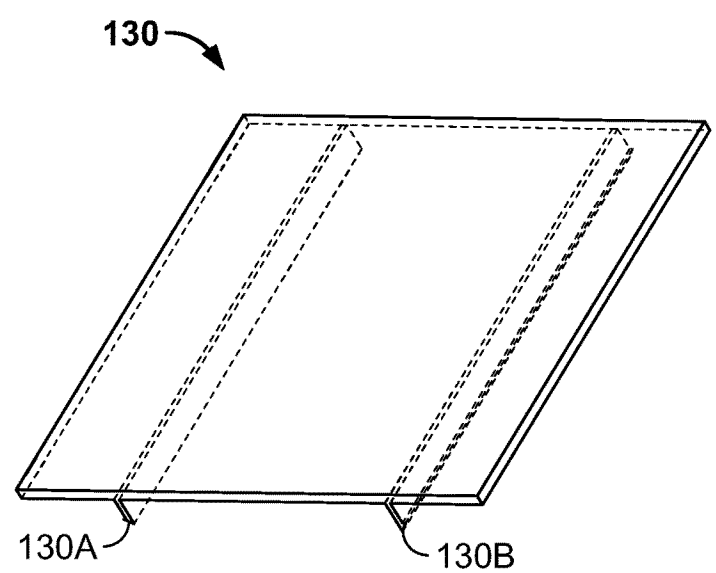
Figure 23:
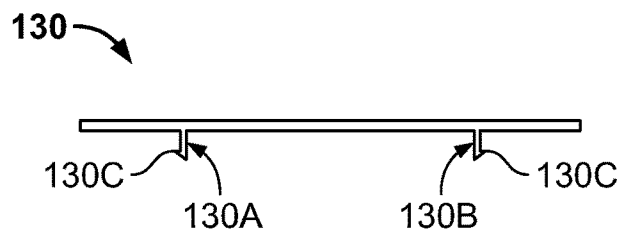
Figure 24:
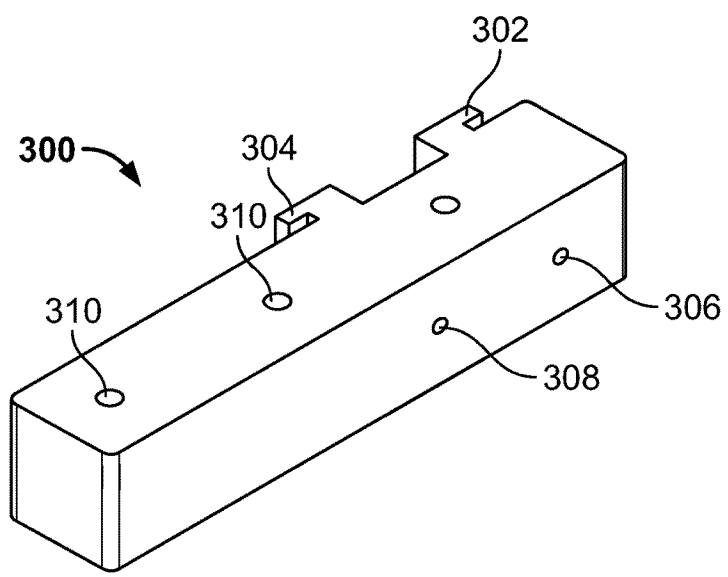

FIG. 14 shows a structural member 60H having attributes like structural member 60 shown in FIGS. 7 and 8 being slipped over the mounted shear block 20. The mounted shear block 20 is sized and shaped to be slidably received in the hollow space 70 of the structural member 60H, such that apertures 103, 105 align with fastener apertures 40 (FIG. 4).

Figure 15:
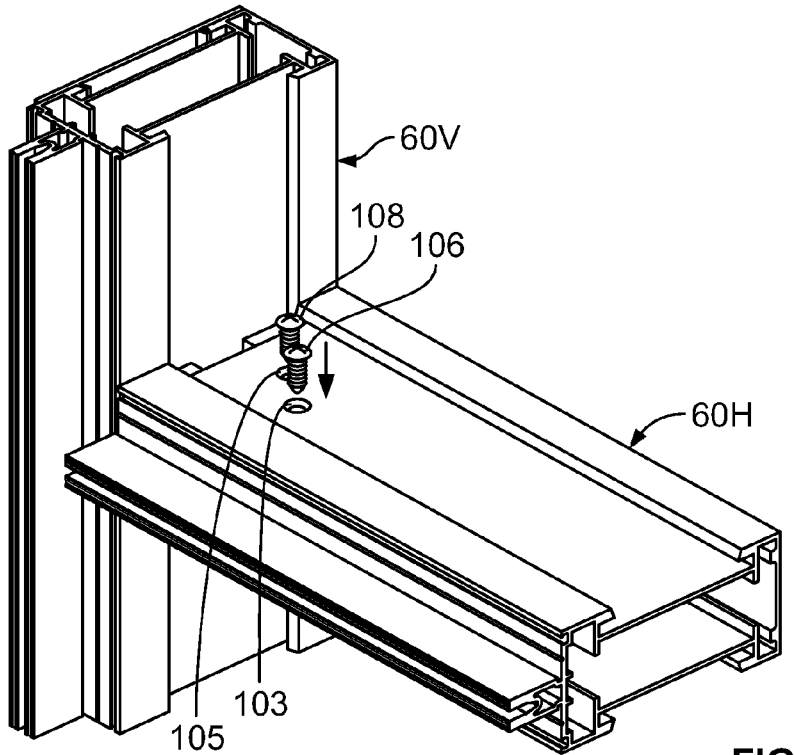
FIGS. 14-16 are a series of perspective views of a sequence of positions in the course of assembling a horizontal structural member to the assembly of FIG. 13.
Figure 16:
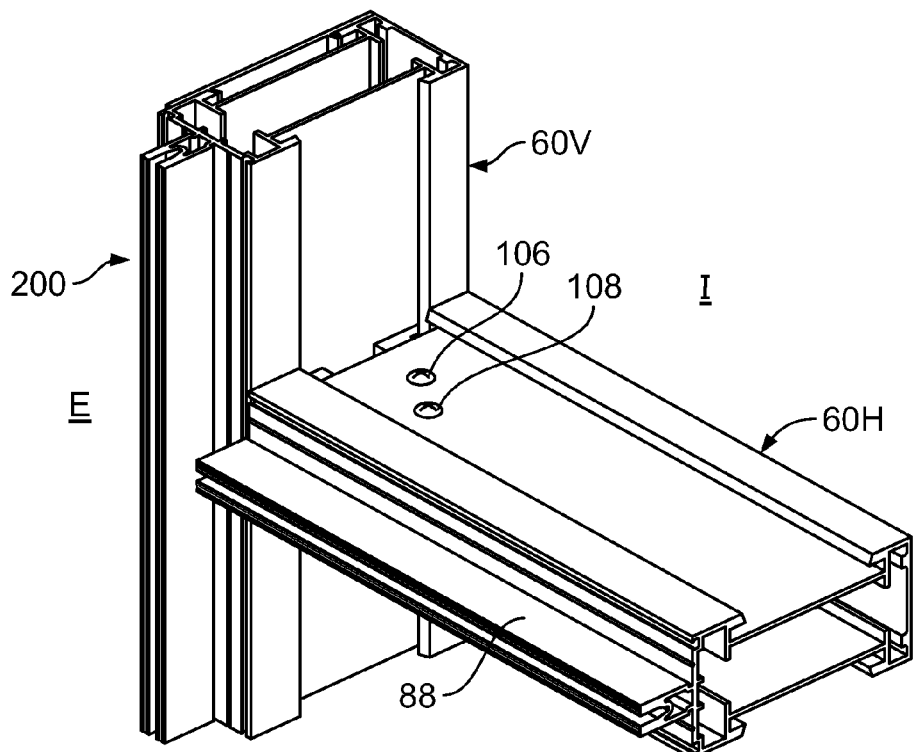

As shown in FIG. 15, screws 106, 108 may be inserted through apertures 103, 105 to secure the structural member 60H to the shear block 20, forming assembly 200 depicted in FIG. 16. Because the horizontal structural member 60H is attached to the shear block 20 with screws 106, 108 in the upper surface, behind an installed glazing panel (not shown)

that sits on tongue 88, rather than through the front face of the mullion as in the traditional designs, the screws 106, 108 are interior to the glazing panel and weather penetration from the exterior E toward the interior I is avoided.

Figure 17:
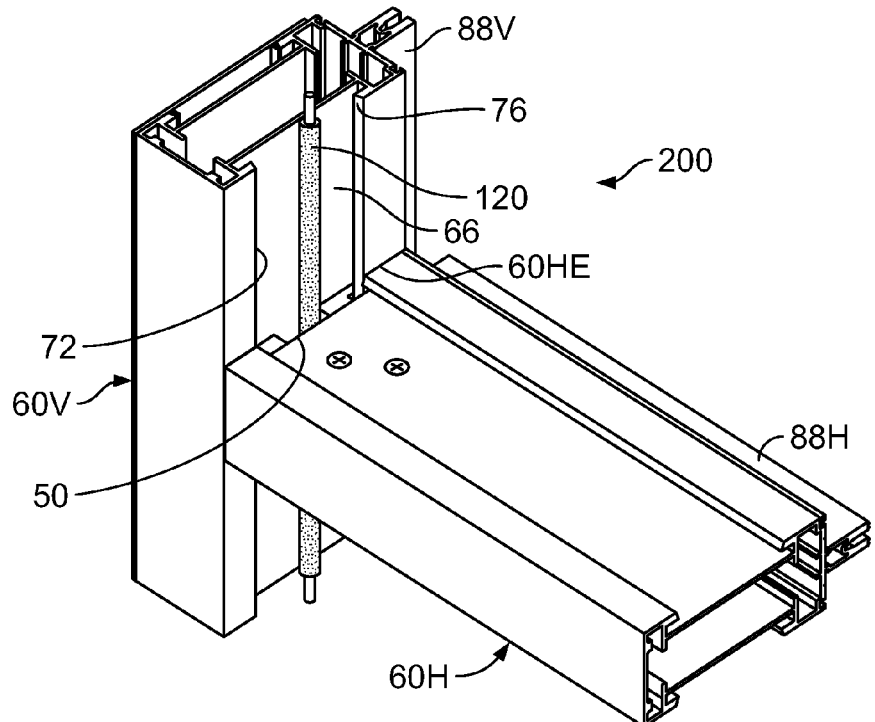
FIGS. 17-20 are a series of perspective views of a sequence of positions of the routing of electrical wiring through the assembly of FIG. 16.

FIG. 17 shows a first wire 120 extending along the structural member 60V parallel to the web 66 between retainer walls 72, 76 and inserted though wire channel 50 of the shear block 20. Since the web 66 is recessed relative to the retainer walls 72, 76, the wire 120 may readily pass between the web 66 and the abutting end 60HE of the structural member 60H. The glazing support tongues 88H and 88V define a mounting recess for a glazing panel (not shown).

Figure 18:
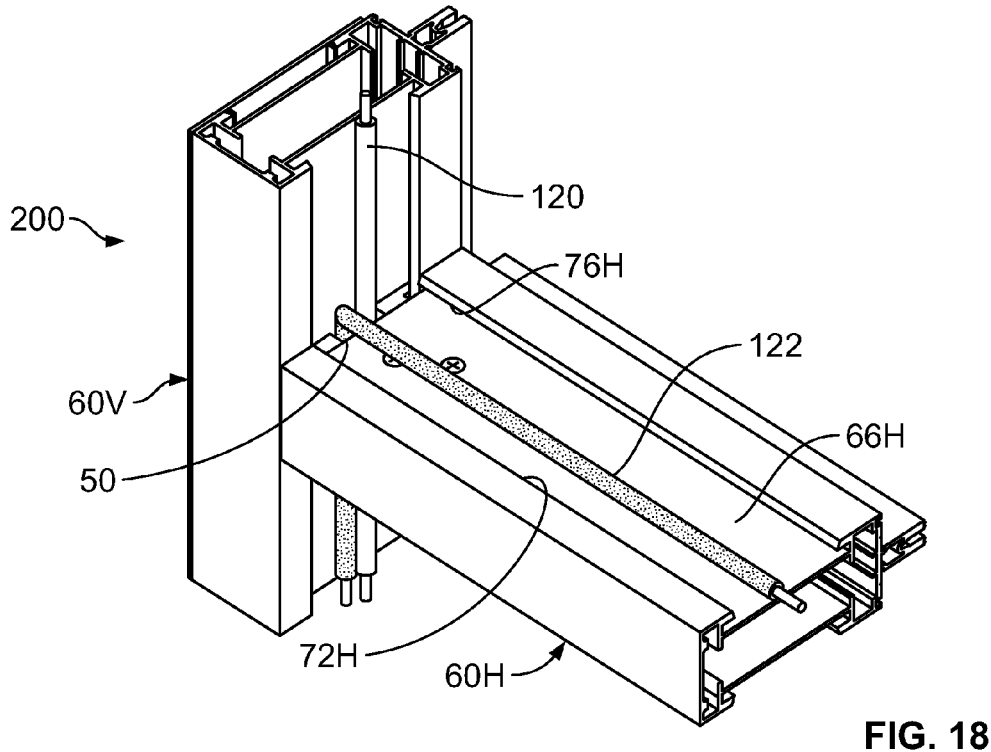

FIG. 18 illustrates how a second wire 122 may be routed parallel to the first wire 120 through wire channel 50 and then diverge to run parallel to web 66H of structural member 60H between retainer walls 72H and 76H. In this manner, the assembly 200 supports the routing of wiring in both the vertical and horizontal directions to convey electricity to any given location on the assembly 200, which, in the case of an assembly constituting a curtain wall, implies direct wiring access to the entire façade of a building. This type of wire management is compatible with "intelligent" building facades incorporating electrical devices and promotes ease of wiring without the need to "fish"/push/pull wiring through inaccessible cavities and reduces or eliminates the need to drill holes through structural members to allow wiring to pass through structural members. Minimizing hole drilling in a curtain wall for wire routing preserves structural integrity and weather-tightness of the curtain wall. As described below, the wiring may be concealed by removable/replaceable covers allowing wire access for changes and maintenance. The wiring may be routed prior to completion of the curtain wall or optionally, after assembly of the curtain wall.

Figure 19:
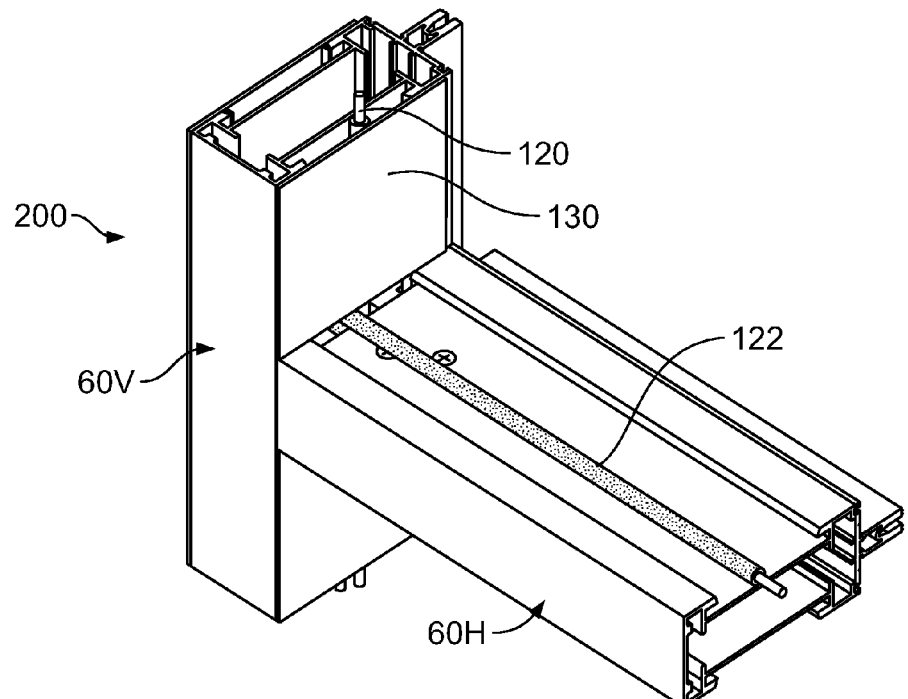
Figure 20:
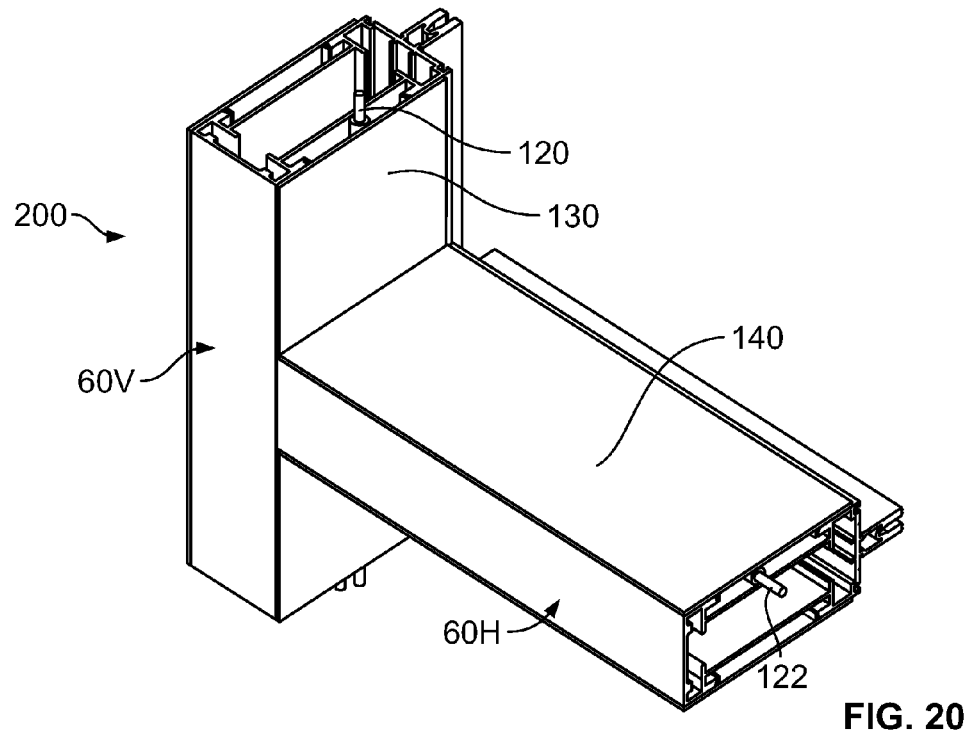

FIGS. 19 and 20 show covers 130 and 140 that may be made from extruded plastic or metal and snap fit or fastened in place by screws or other fasteners to cover the wires 120, 122. The covers, 130, 140 provide a finished aesthetic appearance, as well as protecting the wiring 120, 122 from deterioration or unauthorized contact. In one alternative, the covers 130, 140 may be removably attached to the structural members 60H, 60V, allowing access to the wires 120, 122 for changes and maintenance. The covers 130, 140 also cover any holes 100 made in the structural members 60 V (See FIG. 9) in the event that the hole 100 is not used, e.g., if the original attachment point of the shear block 20 is moved to modify an original placement.

Figure 21:
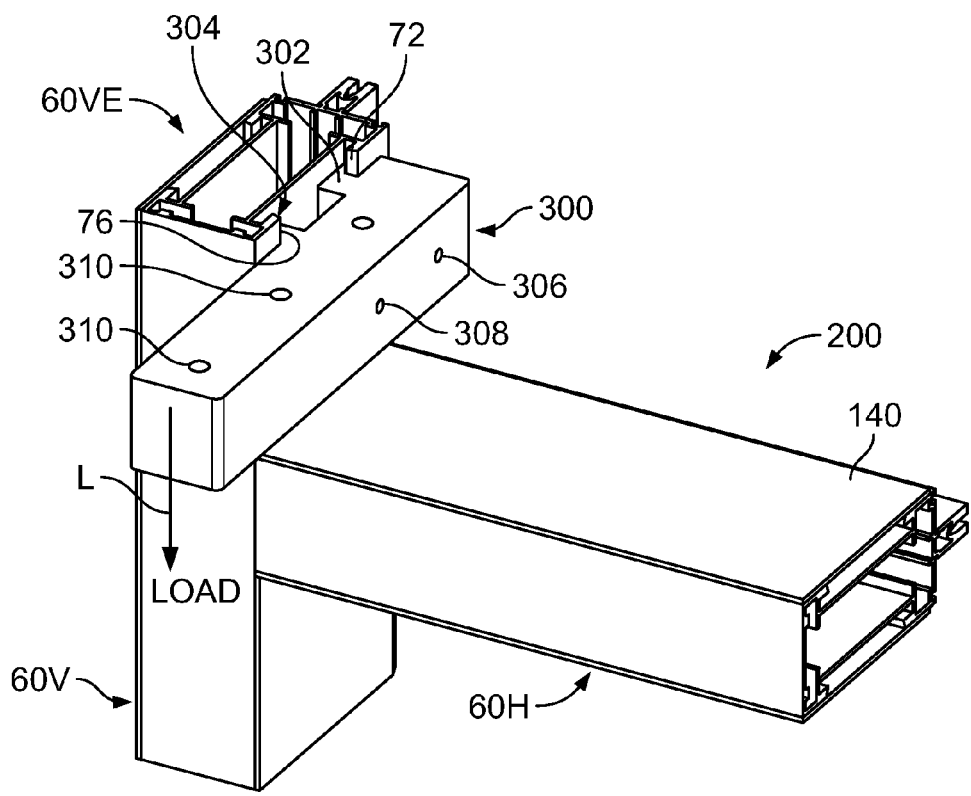
FIG. 21 is a perspective view of a mounting bracket in accordance with an embodiment of the present disclosure mounted on structural members.

FIG. 21 shows an assembly 200 like that described above, supporting a mounting bracket 300, for supporting a given device, such as a light shelf, solar panel, antenna, etc. that is to be fastened to a window system, such as a curtain wall. The mounting bracket 300, has tabs 302, 304 (see FIG. 24) like tabs 26, 28 of the shear block 20 that similarly engage the retainer walls 72, 76 of structural member 60V. Accordingly, the retainer walls 72, 76 perform two functions, namely, interacting with shear blocks 20 and interacting with mounting bracket 300. The mounting bracket 300 may be assembled to the structural member by either the twist and lock approach or the sliding approach. The twist and lock approach allows a mounting bracket 300 to be installed on an existing, assembled structure 200, whereas the sliding approach implies assembling the bracket to the structural member 60V while an end 60VE of the structural element 60V remains open and unobstructed. Apertures 306, 308 may be used to insert fasteners through the mounting bracket 300 to fasten it to the structural member 60 V. A plurality of apertures 310 may be provided to receive fasteners to secure a device like a light shelf (not shown) to the mounting bracket 300. As in FIG. 5, the mounting bracket tabs 302, 304 may feature surfaces like 25 and 27 that prevent rotation in a given direction of the mounting bracket, e.g., counterclockwise, to resist twisting of the mounting bracket 300 in the load direction L.

The weight (load L) of any device installed on the bracket, is supported by a structural member 60H that the bracket 300 rests upon, but need not rest on a structural member 60H. The weight also eccentrically loads the bracket 300 causing the bracket 300 to lock more firmly in place against the retainer walls 72, 76 and surfaces 25, 27. Screws (not shown) extending through apertures 306, 308 may also be used to attach the bracket to the structure 60V. This is in contrast to traditional mounting brackets that are attached by screws that thread into the front face of a structural member like 60V or 60H. The locking feature of the bracket 300 allows the bracket 300 to support more weight than traditional brackets. As described above relative to FIGS. 19 and 20, concealment caps 130, 140 can be applied after the installation of the bracket 300 on the structural member 60V. The bracket 300 can be used to support light shelves, blinds or any other devices that are attached on the inside of a curtain wall. Optionally, two brackets 300 can be installed on a single structural member 60V (one on each lateral side). This is in contrast to the common current practices of use of a single support bracket flush mounted on the front face of a mullion.

Figure 22:
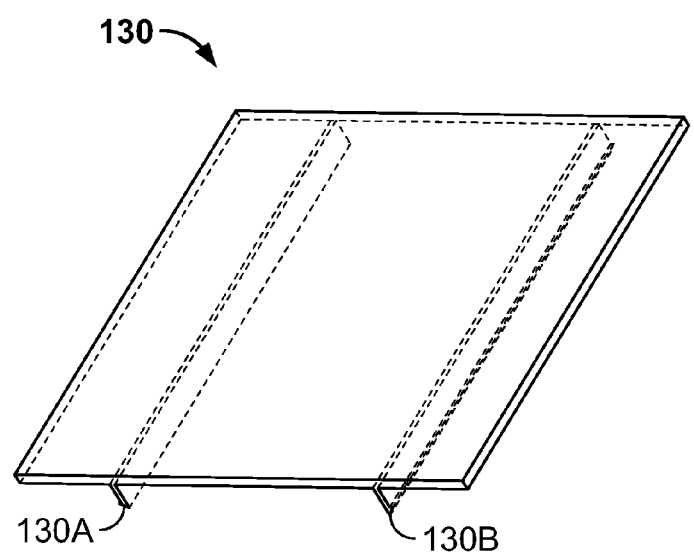
FIG. 22 is a perspective view of a cover in accordance with an embodiment of the present disclosure.
Figure 23:
FIG. 23 is a side view of the cover of FIG. 22.

FIGS. 22 and 23 show cover 130, which features a pair of legs 130A, 130B, each of which may be provided with a barb 130 with a lead-in surface and a grasping ledge for grasping retainer walls 72, 76 (FIG. 8). The legs may extend the entire length of the cover or less than the entire length.

Figure 24:
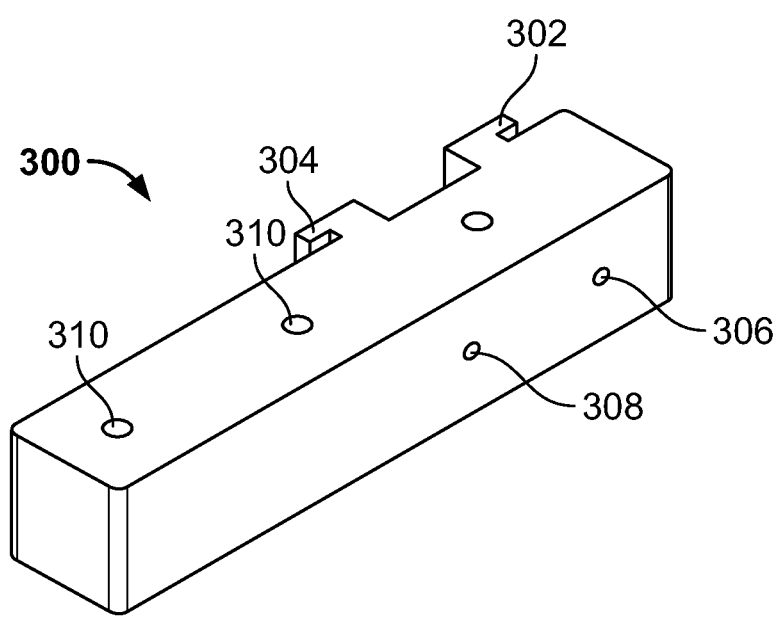
FIG. 24 is a perspective view of the mounting bracket of FIG. 21.
Figure 1:
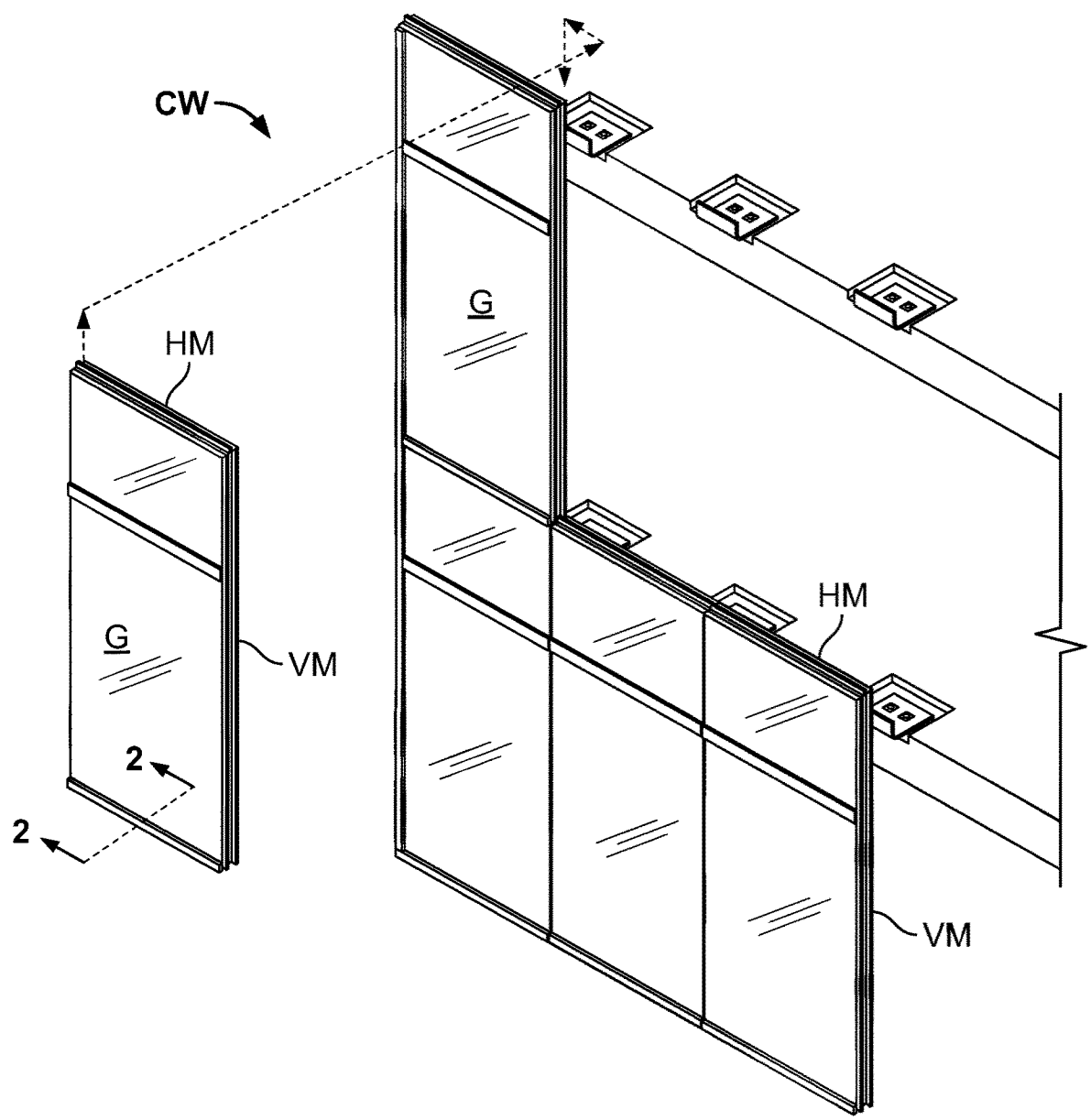
Figure 2:
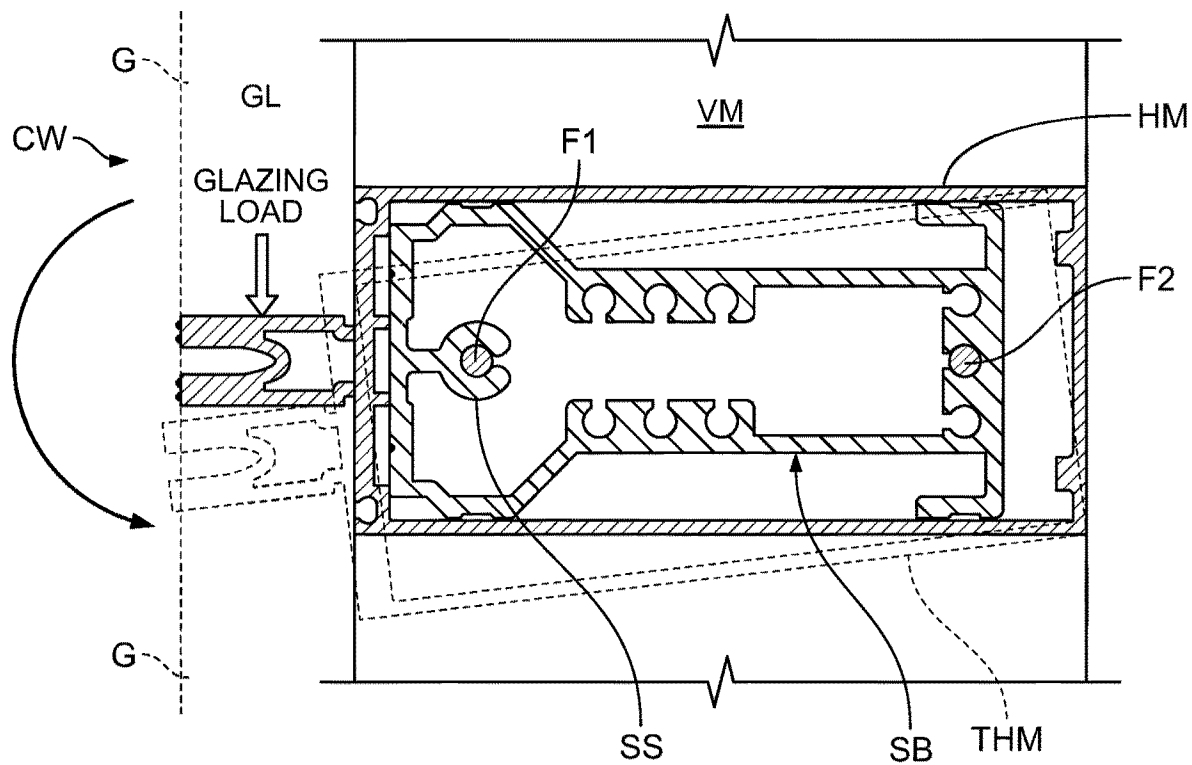
Figure 3:
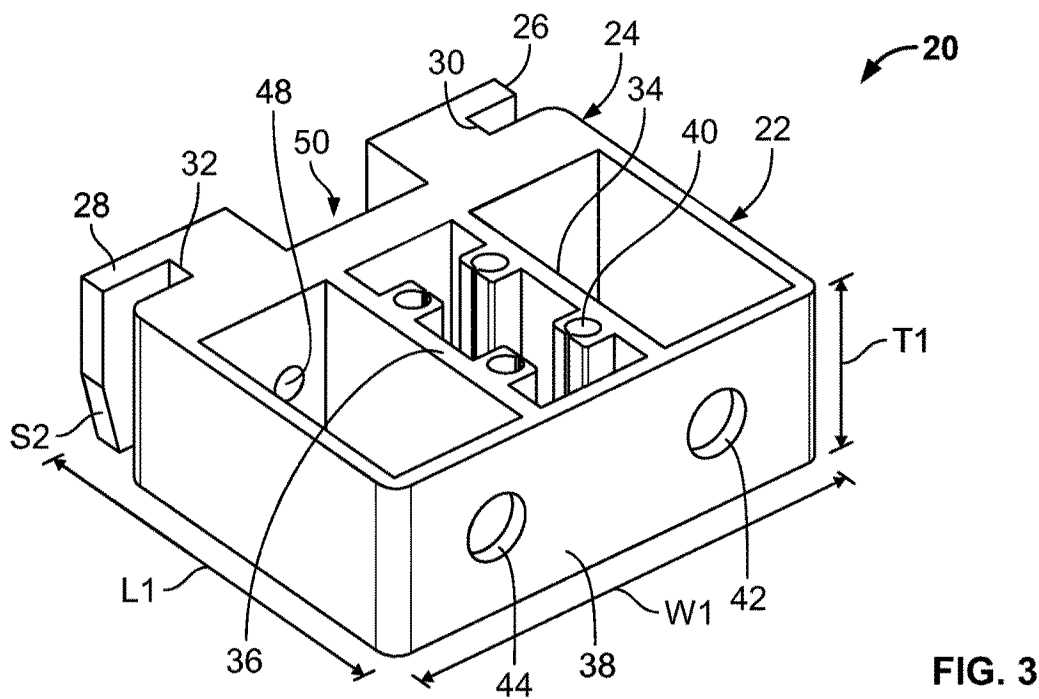
Figure 4:
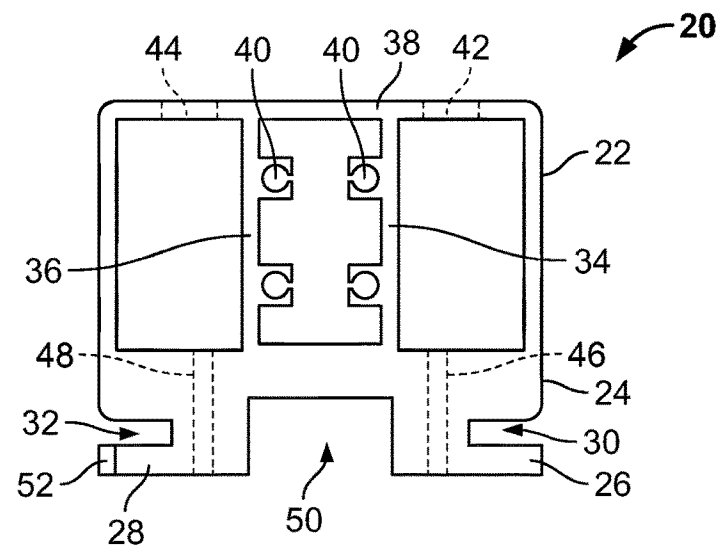
Figure 5:
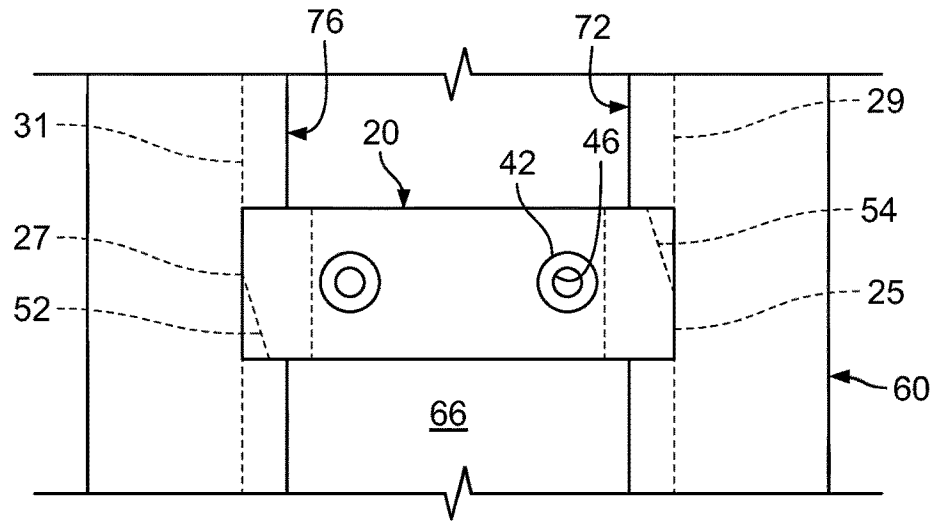
Figure 6:
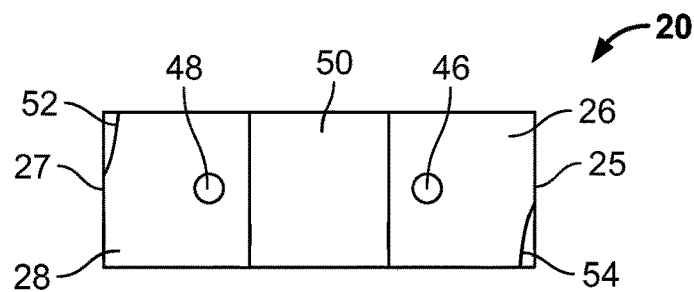
Figure 7:
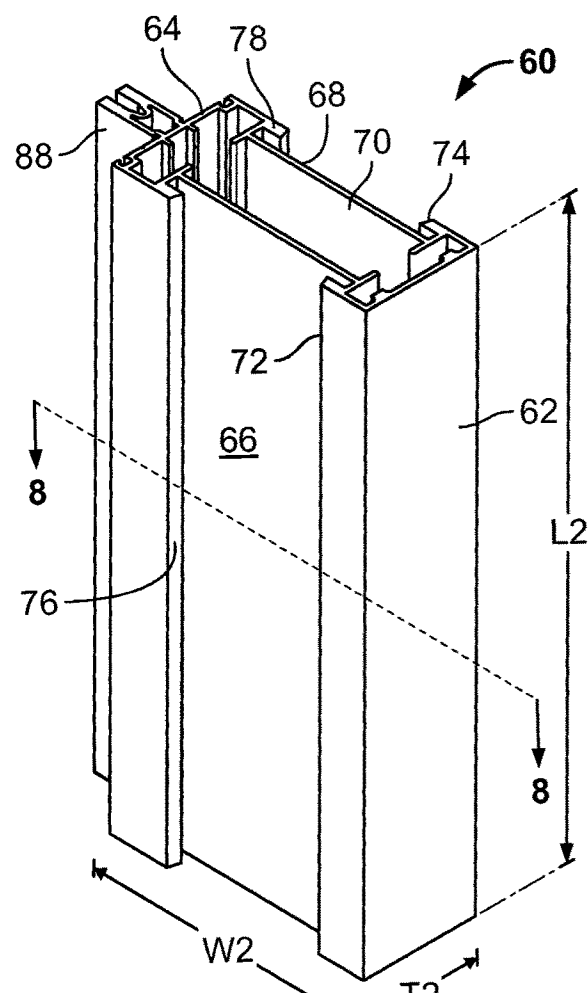
Figure 8:
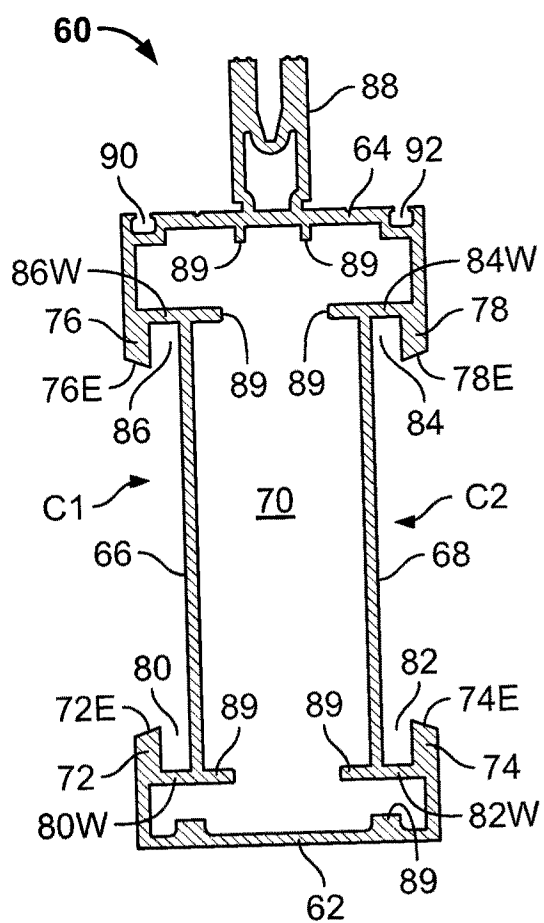
Figure 9:
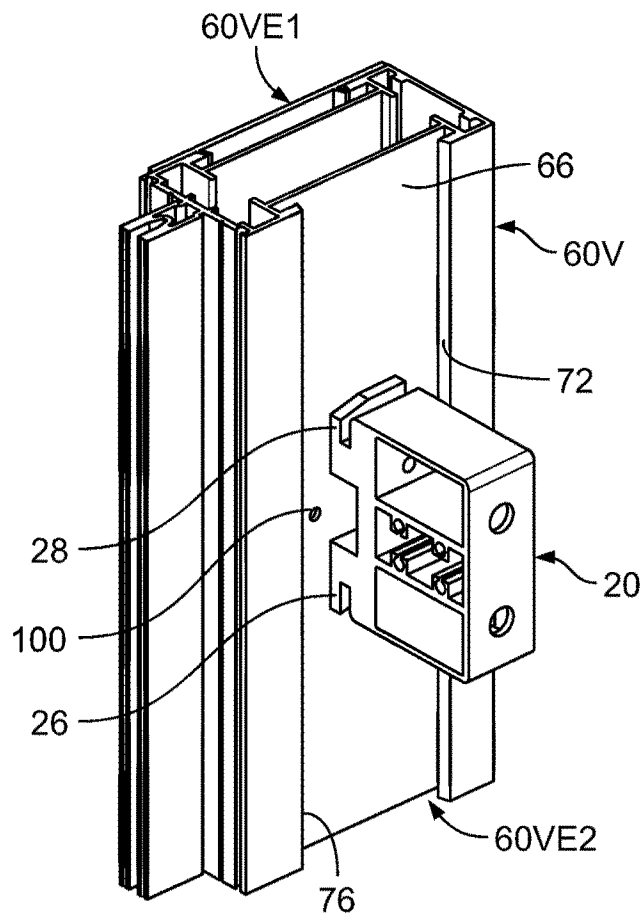
Figure 10:
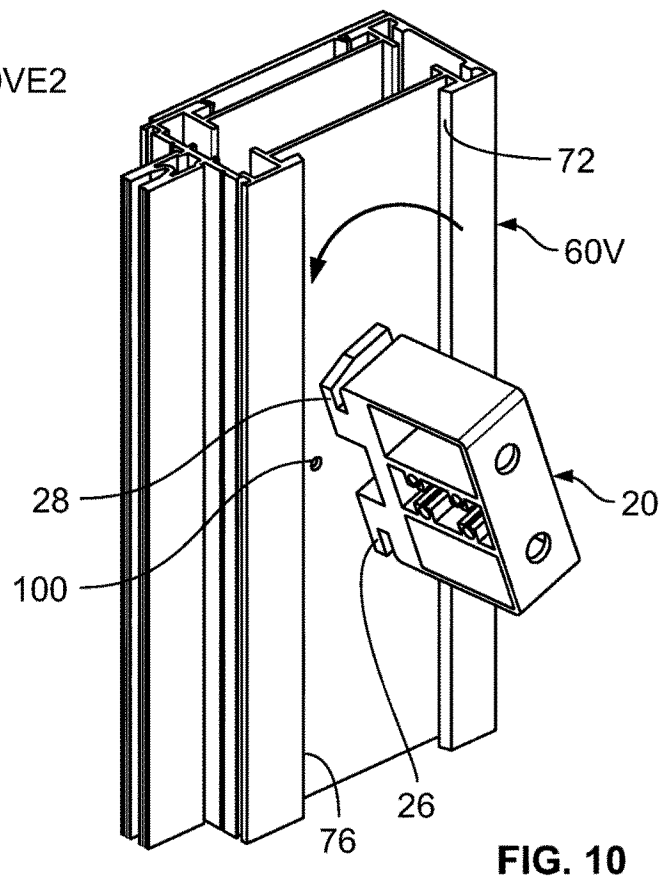
Figure 11:
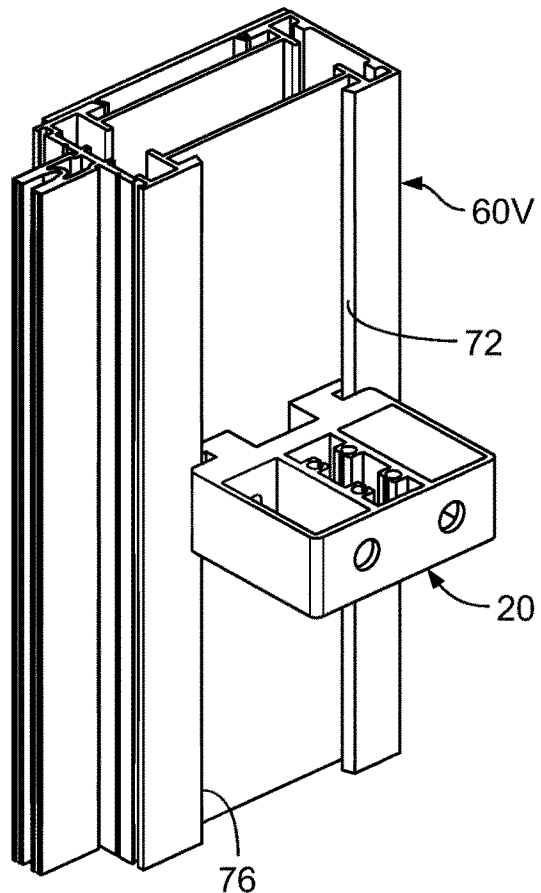
Figure 12:
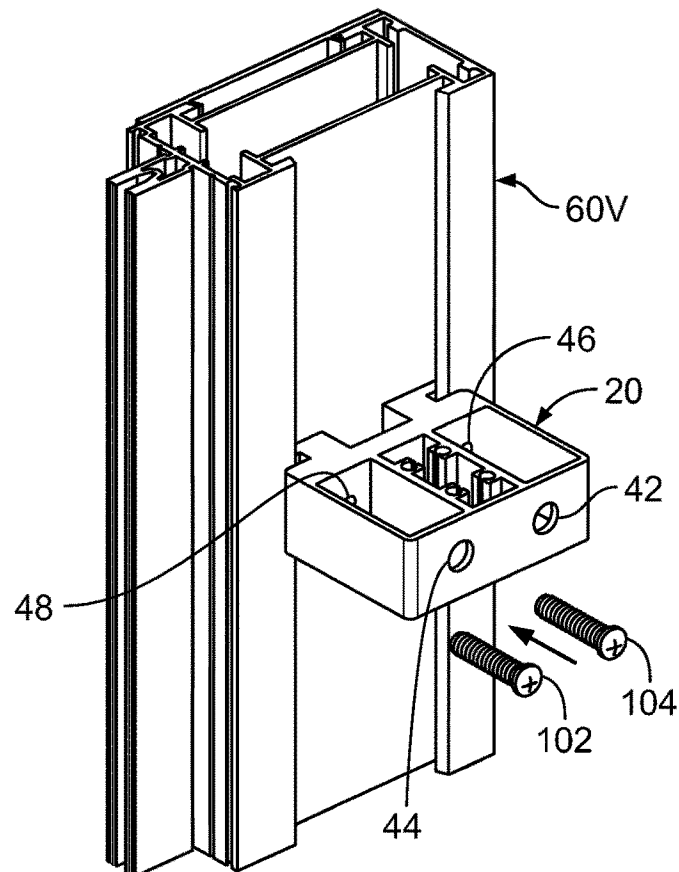

FIG. 24 shows mounting bracket 300 in isolation from structural members 60V and 60H (FIG. 21). As noted above, the mounting bracket 300 has tabs 302, 304 that engage the retainer walls 72, 76 (FIG. 8) of structural member 60V. Apertures 306, 308 may be used to insert fasteners through the mounting bracket 300 to fasten it to the structural member 60 V. A plurality of apertures 310 may be provided to receive fasteners to secure a device like a light shelf (not shown) to the mounting bracket 300.

A curtain wall may be made using the principles of assembly utilized in forming assembly 200 (FIGS. 16-21), which may be executed repeatedly using a selected plurality of structural elements 60 and shear blocks 20 to generate a grid structure of a selected size for supporting a selected number of glazing panels. The teachings of the present disclosure may be used to form a curtain wall that features an anti-rolling shear block and that allows easy wiring to and from the attached electrical elements. The wiring can be done before or after assembly of the curtain wall and produces an installation where the wire is fully concealed. The present disclosure reveals structures and methods facilitating ease of wiring at the joints between the horizontal and vertical structural elements/mullions. In addition, wiring changes after installation and concealment of the wire and mistaken mounting holes are facilitated. The shear block arrangement disclosed provides a strong attachment that resists twisting of the structural elements. Mounting brackets having attachment features similar to those of the shear blocks 20 have similar beneficial attributes. Mounting brackets attached to curtain walls in accordance with the present disclosure attach to the side of structural elements (mullions) rather than on the face of the mullions, which implies reliance on fastener pull-out strength rather than the self-locking mechanism of the present disclosure.

It will be understood that the embodiments described herein are merely exemplary and that a person skilled in the art may make many variations and modifications without departing from the spirit and scope of the claimed subject matter. All such variations and modifications are intended to be included within the scope of the disclosure.

We claim:

1. A structure, comprising:
    a first member having a portion with a C-shaped cross-sectional shape and a pair of retainer walls, a first of the pair of retainer walls attached at a first end of the C-shaped portion and extending at an angle relative thereto, a second of the pair of retainer walls attached at a second end of the C-shaped portion and extending at an angle relative thereto, the pair of retainer walls extending in a direction toward one another;
    a shear block with a base portion having a pair of tabs extending therefrom in opposite directions, the tabs separated from a remainder of the base portion by reliefs, a connector portion extending from the base portion distal to the pair of tabs in a direction perpendicular to the tabs, each relief accommodating a corresponding retainer wall of the pair of retainer walls, capturing the corresponding retainer wall between the tab and the remainder of the base portion with the tabs extending in a direction parallel to an intermediate portion of the C-shaped portion between the first end and the second end thereof and positioned between the intermediate portion and the retainer wall, coupling the shear block to the first member;
    a second member having a hollow therein, the connector portion of the shear block matingly received in the hollow.

2. The structure of claim 1, wherein the second member has a glazing support tongue extending from an exterior surface of the second member, the structure supporting at least one glazing panel.

3. The structure of claim 1, further comprising a plurality of first members, a plurality of second members and a plurality of shear blocks, the first members and second members being mullions for a window system.

4. The structure of claim 1, wherein the shear block is fastened to the first member by fasteners.

5. The structure of claim 4, wherein the shear block is fastened to the second member by fasteners extending through the second member into the shear block.

6. The structure of claim 1, wherein the shear block has a first rotational position with the shear block inserted into the C-shape of the first member with the tabs proximate the intermediate portion and with the retainer walls outside the recesses and a second rotational position rotationally offset relative to the first rotational position with the retainer walls inserted into the reliefs, and wherein at least one of the tabs abuts against a portion of the C cross-sectional shape in the second rotational position, preventing further rotation.

7. The structure of claim 6, wherein each of the tabs is relieved on at least one leading edge thereof, as defined by the direction of rotation in going from the first rotational position to the second rotational position.

8. The structure of claim 6, wherein the first member has a length, a width and a thickness, the length dimension having a vertical component, the shear block having a width, a thickness and a length, the length direction of the shear block extending away from the first member, the width of the shear block having a horizontal component and the second rotational position is with the width dimension of the shear block at about 90 degrees relative to the length of the first member.

9. The structure of claim 8, wherein the first member is approximately vertical and the second member is approximately horizontal.

10. The structure of claim 1, wherein the base portion of the shear block abuts against the first member at an intermediate portion of the C-shape, the base portion having a channel between the tabs defining a passage between the shear block and the intermediate portion.

11. The structure of claim 10, further comprising a wire extending through the channel.

12. The structure of claim 1, wherein the connector portion is hollow having a pair of side walls extending from the base portion to a top wall distal to the base portion.

13. The structure of claim 12, wherein the connector portion has at least one intermediate wall positioned between the side walls and extending the full length between the base portion and the top wall.

14. The structure of claim 1, wherein the first member has a pair of oppositely directed C-shaped portions.

15. The structure of claim 14, wherein the oppositely directed C-shaped portions of the first member are spaced apart and further comprising a first cap connected to a first end of each C-shape, bridging the spaced C-shapes and a second cap connected to a second end of each C-shape, bridging the spaced C-shapes, forming a fully enclosed hollow I-shaped structure in cross-section.

16. The structure of claim 15, wherein the hollow I-shaped structure has at least one internal strengthening rib positioned within the hollow thereof.

17. The structure of claim 15, wherein the cross-sectional shape of the second member is the same as the cross-sectional shape of the first member.

18. The structure of claim 17, wherein the I-shaped structure has at least two internal strengthening ribs defining the shape of the hollow that matingly receives the connector portion of the shear block.

19. The structure of claim 17, further comprising an electrical conductor element extending through at least one of the C-shapes in at least one of the first or second members.

20. The structure of claim 19, wherein the electrical conductor element extends through the C-shapes of both the first and second members without passing through an aperture in either the first member or the second member.

21. The structure of claim 1, wherein the cross-sectional shape of the second member approximates the cross-sectional shape of the first member and further comprising a cover bridging the corresponding C-shape and removably attached to at least one of the first or second members.

22. The structure of claim 21, wherein the cover has at least one resilient leg that grips the first or second member to establish a snap fit.

23. A structure, comprising:
    a first member having a portion with a C-shaped cross-sectional shape and a pair of retainer walls, a first of the pair of retainer walls attached at a first end of the C-shaped portion and extending at an angle relative thereto, a second of the pair of retainer walls attached at a second end of the C-shaped portion and extending at an angle relative thereto;
    a shear block with a base portion having a pair of opposed tabs extending therefrom, the tabs separated from a remainder of the base portion by reliefs, a connector portion extending from the base portion, each relief accommodating a corresponding retainer wall of the pair of retainer walls, capturing the corresponding retainer wall between the tab and the remainder of the base portion, coupling the shear block to the first member;

a second member having a hollow therein, the connector portion of the shear block matingly received in the hollow;

a mounting bracket with a base portion having a pair of opposed tabs extending therefrom, the tabs separated from a remainder of the base portion by reliefs, and a bracket portion extending from the base portion, each relief of the mounting bracket accommodating a corresponding retainer wall of the pair of retainer walls, capturing the corresponding retainer wall between the tab thereof and the remainder of the base portion thereof, coupling the mounting bracket to the first member.

24. The structure of claim 23, wherein the retainer walls of the first member extend toward one another and the shear block is fastened to the first member by fasteners and wherein at least one of the tabs of the mounting bracket base portion abut against a portion of the C cross-sectional shape when the shear block is rotated to a selected position relative to the first member, preventing further rotation.

25. A structure comprising:
a first member and a second member each having a pair of oppositely directed C-shaped portions having a C-shaped cross-sectional shape and a pair of retainer walls, a first of the pair of retainer walls attached at a first end of each C-shaped portion and extending at an angle relative thereto, a second of the pair of retainer walls attached at a second end of each C-shaped portion and extending at an angle relative thereto, the retainer walls extending toward one another, the oppositely directed C-shaped portions of the first member being spaced apart with a first cap structure connected to a first end of each C-shape, bridging the spaced C-shapes and a second cap structure connected to a second end of each C-shape, bridging the spaced C-shapes, forming a hollow I-shaped structure in cross-section, each of the first member and the second member having a glazing support tongue, the structure supporting at least one glazing panel;

a shear block with a base portion having a pair of opposed tabs extending therefrom in opposite directions, the tabs separated from a remainder of the base portion by reliefs, a connector portion extending from the base portion distal to the pair of tabs and in a direction perpendicular to the tabs, each relief accommodating a corresponding retainer wall of the pair of retainer walls, capturing the corresponding retainer wall between the tab and the remainder of the base portion with the tabs extending in a direction parallel to an intermediate portion of the C-shaped portion between the first end and the second end thereof and positioned between the intermediate portion and the retainer wall, coupling the shear block to the first member, the shear block fastened to the first member by fasteners, the hollow of the second member receiving the connector portion of the shear block matingly therein, the shear block fastened to the second member by fasteners extending through the second member into the shear block.

26. The structure of claim 25, further comprising an electrical wire passing through one of the C-shaped portions and a cover bridging one of the C-shaped portions removably attached to at least one of the first member or the second member.

27. The structure of claim 26, further comprising a plurality of first members, a plurality of second members and a plurality of shear blocks, the first members and second members forming mullions for a curtain wall window system.

* * * * *

UNITED STATES PATENT AND TRADEMARK OFFICE
CERTIFICATE OF CORRECTION

| | | |
|---|---|---|
| PATENT NO. | : 9,567,746 B1 | |
| APPLICATION NO. | : 14/884319 | |
| DATED | : February 14, 2017 | |
| INVENTOR(S) | : Barbulescu et al. | |

It is certified that error appears in the above-identified patent and that said Letters Patent is hereby corrected as shown below:

Please delete Patent No. 9,567,746 B1 in its entirety and replace with Patent No. 9,567,746 B1 in its entirety.

Signed and Sealed this
Tenth Day of November, 2020

Andrei Iancu
*Director of the United States Patent and Trademark Office*

(12) United States Patent
Barbulescu et al.

(10) Patent No.: US 9,567,746 B1
(45) Date of Patent: Feb. 14, 2017

(54) CURTAIN WALL SYSTEM WITH ANTI-ROLLING SHEAR BLOCK

(71) Applicant: Alcoa Inc., Pittsburgh, PA (US)

(72) Inventors: Ion-Horatiu Barbulescu, Atlanta, GA (US); William J. Hooper, Lawrenceville, GA (US); Christopher R. Hartwell, Suwanee, GA (US)

(73) Assignee: Arconic Inc., Pittsburgh, PA (US)

( * ) Notice: Subject to any disclaimer, the term of this patent is extended or adjusted under 35 U.S.C. 154(b) by 0 days.

(21) Appl. No.: 14/884,319

(22) Filed: Oct. 15, 2015

(51) Int. Cl.
  *E04B 2/96* (2006.01)
  *H02G 3/38* (2006.01)

(52) U.S. Cl.
  CPC .............. *E04B 2/965* (2013.01); *E04B 2/967* (2013.01); *H02G 3/388* (2013.01)

(58) Field of Classification Search
  None
  See application file for complete search history.

(56) References Cited

U.S. PATENT DOCUMENTS

| | | | | |
|---|---|---|---|---|
| 3,561,801 A | * | 2/1971 | Chiu | F16B 7/0446 403/264 |
| 3,772,837 A | * | 11/1973 | Hunt | E04B 2/766 256/65.01 |
| 3,940,897 A | * | 3/1976 | Stoakes | E04B 2/60 52/204.591 |
| 4,031,680 A | * | 6/1977 | Stoakes | E04B 2/965 52/204.597 |
| 4,584,804 A | * | 4/1986 | Tajima | E04B 2/7863 52/209 |
| 4,707,959 A | * | 11/1987 | Stoakes | E04B 2/965 52/235 |
| 5,067,293 A | * | 11/1991 | Reynolds | E04B 2/965 52/235 |
| 5,107,647 A | * | 4/1992 | Danielewicz | E04B 1/0046 52/204.597 |
| 5,307,597 A | * | 5/1994 | Tanikawa | E06B 7/14 52/235 |
| 5,481,839 A | * | 1/1996 | Lang | E04B 2/967 52/235 |
| 5,546,718 A | * | 8/1996 | Way | E04B 2/7448 160/135 |
| 5,771,640 A | * | 6/1998 | Back | E04B 1/0046 52/204.7 |
| 5,839,236 A | * | 11/1998 | Frey | E04B 2/965 52/235 |

(Continued)

OTHER PUBLICATIONS

1600 Wall System (TM) Curtain Wall Features, Jun. 2015 EC 97911-075.

*Primary Examiner* — Rodney Mintz
(74) *Attorney, Agent, or Firm* — Greenberg Traurig, LLP

(57) ABSTRACT

A curtain wall has a plurality of hollow, extruded vertical and horizontal members. The members have a pair of spaced retainer walls which engage a shear block with a pair of tabs that twist locks onto the retainer walls before fastening the block to the member. A second member slips over the block and is fastened by screws. The abutment of the tabs limits rotation of the block and attached member, providing support for a glazing panel attached to the members. The members have longitudinal recesses accommodating wiring that may be covered with a cover. A bracket interacting with the retainer walls like a shear block may also be used.

27 Claims, 12 Drawing Sheets

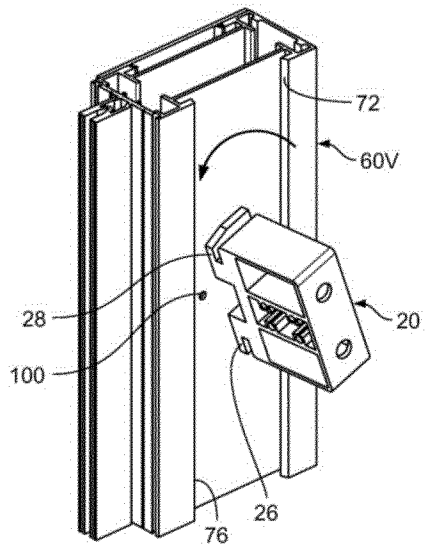

(56) References Cited

U.S. PATENT DOCUMENTS

| | | | | |
|---|---|---|---|---|
| 6,226,940 B1 * | 5/2001 | Biebuyck | ............... | E04B 2/962 52/235 |
| 7,752,818 B1 * | 7/2010 | Roegge | ............... | E04F 13/0814 52/235 |
| 8,800,221 B1 * | 8/2014 | Header | ............... | E04B 2/88 52/204.5 |
| 2003/0226324 A1 * | 12/2003 | Hogan | ............... | E04B 2/96 52/235 |
| 2004/0031220 A1 * | 2/2004 | Hocker | ............... | E04B 2/965 52/235 |
| 2004/0079038 A1 * | 4/2004 | Crooker, Jr. | ............... | E04B 2/96 52/235 |
| 2005/0284053 A1 * | 12/2005 | Grunewald | ............... | E04B 2/96 52/235 |
| 2006/0016137 A1 * | 1/2006 | Ferro | ............... | E04B 2/965 52/235 |
| 2006/0080917 A1 * | 4/2006 | Hall | ............... | E04B 2/965 52/235 |
| 2006/0201084 A1 * | 9/2006 | Arias | ............... | E04B 2/965 52/235 |
| 2007/0094955 A1 * | 5/2007 | Safford | ............... | E04B 2/885 52/204.5 |
| 2011/0138727 A1 * | 6/2011 | Labrecque | ............... | E04B 2/965 52/483.1 |
| 2012/0210664 A1 * | 8/2012 | Lang | ............... | E04B 2/965 52/407.2 |
| 2014/0075868 A1 * | 3/2014 | Kerley | ............... | E05B 65/006 52/238.1 |
| 2014/0090319 A1 * | 4/2014 | Swartz | ............... | E04B 2/967 52/235 |

\* cited by examiner

CURTAIN WALL SYSTEM WITH ANTI-ROLLING SHEAR BLOCK

FIELD

The present invention relates to structures for buildings and more particularly to members and manufactures for making window structures, such as curtain walls, methods and apparatus for managing electrical wiring in window structures, as well as, apparatus and methods for attaching devices to window structures.

BACKGROUND

Curtain walls typically include a plurality of glazing panels (windows made of glass or plastic) supported in a framework of vertical and horizontal structural elements. Some known curtain walls utilize shear blocks to attach a horizontal structural element (mullion) to a vertical structural element (mullion), e.g., a curtain wall manufactured by Kawneer/Alcoa of Norcross, Ga. known as 1600 has such features. Shear blocks can roll/twist if the weight of the glazing unit or other load supported by the horizontal mullion exceeds the capacity of the shear blocks, causing the integrity of the curtain wall/glazing unit to be compromised. This may happen, e.g., if a curtain wall designed for single glazed glazing panels or double glazing is fitted with triple glazed glazing panels or if an overload is placed on the mullion through accident or misuse.

Another attribute of curtain walls is that they are increasingly being used as a support for installed devices and structures, such as sunshades, light shelves, canopies, etc. These devices may be attached with brackets and fasteners, such as screws, to a surface of the horizontal or vertical members of a curtain wall, e.g., the front face of a mullion. The weight of such installed devices must be controlled so as not to exceed the pullout values of the fasteners extending into the curtain wall. In addition, if a given device is removed or repositioned, the mounting holes used by the fasteners remain in the curtain wall surface compromising the appearance and integrity of the curtain wall.

The devices installed on curtain walls include those that use or generate electricity and therefore have attendant wiring to and from associated circuits inside and/or outside the building on which the curtain wall is present. For example, signage, power generating devices, such as solar panels, power generating windmills, sunshades and light shelves may be attached to a curtain wall façade. In addition, buildings increasingly utilize sensors, lighting devices, surveillance and communication devices, such as antennas, that require associated wiring. Wiring on, in or through a curtain wall presents challenges, in that drilling through mullions weakens them and degrades weather intrusion resistance. The wiring or electrical conduit is unsightly and it is difficult to route wiring through the interior hollows of curtain walls, as this typically requires pushing or pulling wire through elongated hidden channels, which may have constrictions and hidden obstacles. The wiring of devices mounted on or near a curtain wall is typically done after installation of the device to be wired. Once installed on, in or through a curtain wall, it is difficult to trace a specific wire to remove or replace it. Alternative curtain wall systems therefore remain desirable.

SUMMARY

The disclosed subject matter relates to a structure having a first member with a portion having a C-shaped cross-sectional shape and a pair of retainer walls, a first of the pair of retainer walls attached at a first end of the C-shaped portion and extending at an angle relative thereto, a second of the pair of retainer walls attached at a second end of the C-shaped portion and extending at an angle relative thereto; a shear block with a base portion having a pair of opposed tabs extending therefrom, the tabs separated from a remainder of the base portion by reliefs, a connector portion extending from the base portion, each relief accommodating a corresponding retainer wall of the pair of retainer walls, capturing the corresponding retainer wall between the tab and the remainder of the base portion, coupling the shear block to the first member; and a second member having a hollow therein, the connector portion of the shear block matingly received in the hollow.

In another embodiment, the retainer walls extend toward one another and the shear block is fastened to the first member by fasteners.

In another embodiment, the shear block is fastened to the second member by fasteners extending through the second member into the shear block.

In another embodiment, at least one of the tabs abut against a portion of the C cross-sectional shape when the shear block is rotated to a selected position relative to the first member, preventing further rotation.

In another embodiment, the first member has a length, a width and a thickness, the length dimension having a vertical component, the shear block having a width, a thickness and a length, the length direction of the shear block extending away from the first member, the width of the shear block having a horizontal component and the selected position is with the width dimension of the shear block at about 90 degrees relative to the length of the first member.

In another embodiment, the first member is approximately vertical and the second member is approximately horizontal.

In another embodiment, the base portion of the shear block abuts against the first member at an intermediate portion of the C-shape, the base portion having a channel between the tabs.

In another embodiment, a wire extends through the channel.

In another embodiment, the connector portion is hollow having a pair of side walls extending from the base portion to a top wall distal to the base portion.

In another embodiment, the connector portion has at least one intermediate wall positioned between the side walls and extending between the base portion and the top wall.

In another embodiment, the first member has a pair of oppositely directed C-shaped portions.

In another embodiment, the second member has a glazing support tongue, the structure supporting at least one glazing panel.

In another embodiment, the structure has a plurality of first members, a plurality of second members and a plurality of shear blocks, the first members and second members being mullions for a window system.

In another embodiment, the oppositely directed C-shaped portions of the first member are spaced apart and further comprising a first cap connected to a first end of each C-shape, bridging the spaced C-shapes and a second cap connected to a second end of each C-shape, bridging the spaced C-shapes, forming a hollow I-shaped structure in cross-section.

In another embodiment, the I-shaped first member has at least one internal strengthening rib positioned within the hollow thereof.

In another embodiment, the cross-sectional shape of the second member approximates the cross-sectional shape of the first member.

In another embodiment, the I-shaped structure has at least two internal strengthening ribs defining the shape of the hollow that matingly receives the connector portion of the shear block.

In another embodiment, the structure has an electrical conductor element extending through at least one of the C-shapes in at least one of the first or second members.

In another embodiment, the electrical conductor element extends through the C-shapes of both the first and second members.

In another embodiment, the cross-sectional shape of the second member approximates the cross-sectional shape of the first member and further comprising a cover bridging the corresponding C-shape and removably attached to at least one of the first or second members.

In another embodiment, the cover has at least one resilient leg that grips the first or second member to establish a snap fit.

In another embodiment, the structure has a mounting bracket with a base portion having a pair of opposed tabs extending therefrom, the tabs separated from a remainder of the base portion by reliefs, and a bracket portion extending from the base portion, each relief of the mounting bracket accommodating a corresponding retainer wall of the pair of retainer walls, capturing the corresponding retainer wall between the tab thereof and the remainder of the base portion thereof, coupling the mounting bracket to the first member.

In another embodiment, the retainer walls of the first member extend toward one another and the shear block is fastened to the first member by fasteners and wherein at least one of the tabs of the mounting bracket base portion abut against a portion of the C cross-sectional shape when the shear block is rotated to a selected position relative to the first member, preventing further rotation.

In another embodiment, each of the tabs is relieved on at least one edge thereof.

In another embodiment, a structure has a first member and a second member each having a pair of oppositely directed C-shaped portions having a C-shaped cross-sectional shape and a pair of retainer walls, a first of the pair of retainer walls attached at a first end of each C-shaped portion and extending at an angle relative thereto, a second of the pair of retainer walls attached at a second end of each C-shaped portion and extending at an angle relative thereto, the retainer walls extending toward one another, the oppositely directed C-shaped portions of the first member being spaced apart with a first cap structure connected to a first end of each C-shape, bridging the spaced C-shapes and a second cap structure connected to a second end of each C-shape, bridging the spaced C-shapes, forming a hollow I-shaped structure in cross-section, each of the first member and the second member having a glazing support tongue, the structure supporting at least one glazing panel; a shear block with a base portion having a pair of opposed tabs extending therefrom, the tabs separated from a remainder of the base portion by reliefs, a connector portion extending from the base portion, each relief accommodating a corresponding retainer wall of the pair of retainer walls, capturing the corresponding retainer wall between the tab and the remainder of the base portion, coupling the shear block to the first member, the shear block fastened to the first member by fasteners, the hollow of the second member receiving the connector portion of the shear block matingly therein, the shear block fastened to the second member by fasteners extending through the second member into the shear block.

In another embodiment, the structure has an electrical wire passing through one of the C-shaped portions and a cover bridging one of the C-shaped portions removably attached to at least one of the first member or the second member.

In another embodiment, the structure has a plurality of first members, a plurality of second members and a plurality of shear blocks, the first members and second members forming mullions for a curtain wall window system.

BRIEF DESCRIPTION OF THE DRAWINGS

For a more complete understanding of the present disclosure, reference is made to the following detailed description of exemplary embodiments considered in conjunction with the accompanying drawings.

FIG. 1 is exploded, perspective view of a curtain wall in accordance with the prior art.

FIG. 2 is a cross-sectional view of a horizontal member shown in FIG. 1, taken along section line 2-2 and looking in the direction of the arrows.

FIG. 3 is a perspective view of a shear block in accordance with an embodiment of the present disclosure.

FIG. 4 is a plan view of the shear block of FIG. 3.

FIG. 5 is a front view of the shear block of FIGS. 3 and 4 installed on a structural member.

Figure 6:
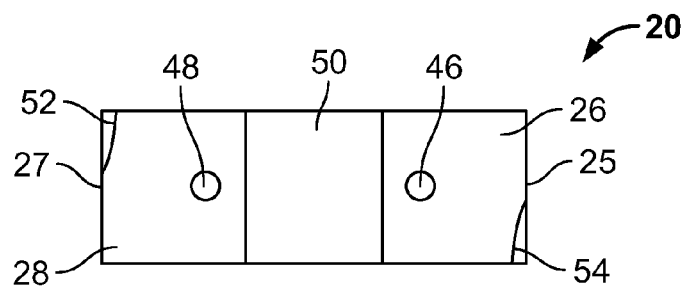
FIG. 6 is a rear view of the shear block of FIGS. 3-5.

FIG. 6 is a rear view of the shear block of FIGS. 3-5.

FIG. 7 is a perspective view of the structural member of FIG. 5.

FIG. 8 is a cross sectional view of the structural member of FIG. 7 taken along section line 8-8 and looking in the direction of the arrows.

FIGS. 9-13 are a series of perspective views of a sequence of positions of the shear block of FIGS. 3-6 in the course of assembling the shear block to the structural member of FIGS. 7 and 8.

Figure 13:
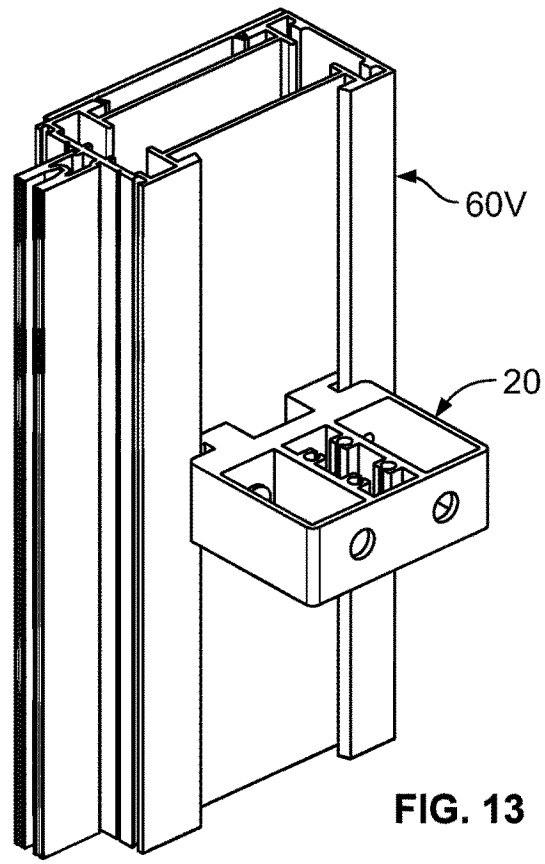

FIGS. 14-16 are a series of perspective views of a sequence of positions in the course of assembling a horizontal structural member to the assembly of FIG. 13.

FIGS. 17-20 are a series of perspective views of a sequence of positions of the routing of electrical wiring through the assembly of FIG. 16.

FIG. 21 is a perspective view of a mounting bracket in accordance with an embodiment of the present disclosure mounted on structural members.

FIG. 22 is a perspective view of a cover in accordance with an embodiment of the present disclosure.

FIG. 23 is a side view of the cover of FIG. 22.

FIG. 24 is a perspective view of the mounting bracket of FIG. 21.

DETAILED DESCRIPTION OF EXEMPLARY EMBODIMENTS

FIGS. 1 and 2 show a prior art curtain wall structure CW that utilizes shear blocks SB to attach horizontal mullions HM to vertical mullions VM. The shear blocks SB can roll/twist if the weight of the glazing unit G (glazing load GL) supported by the horizontal mullion HM exceeds the capacity of the shear blocks SB, causing the integrity of the curtain wall CW to be compromised. The shear blocks SB may also twist if the horizontal mullions HM are overloaded by an accident or misuse, e.g., being hit by a flying object during a storm or overloaded by an inappropriately installed sign or solar panel. FIG. 2 illustrates a twisted horizontal mullion THM depicted in dotted lines) that has been twisted by eccentric over-loading of the horizontal mullion HM and resultant strain on a prior art shear block SB. In one example, a support structure SS held by fastener F1 may bend, allowing the shear block SB to pivot down on fastener F2. This type of strain on a shear block SB and subsequent movement of a glazing support structure HM (horizontal mullion) can lead to the failure of the curtain wall CW in whole or part.

FIGS. 3, 4, 5 and 6 show a shear block 20 in accordance with the present disclosure, which has a connector portion 22 and a base portion 24. The base portion 24 features a pair of opposed engagement tabs 26 and 28 defined by reliefs 30, 32. The connector portion 22 is generally hollow, but has a pair of members 34, 36 that extend from the base 24 to the top wall 38 of the connector portion 22. Each member 34, 36 has a pair of fastener apertures 40 that may receive, e.g., a bolt, screw, rivet or other fastener for fastening the shear block 20 to a structural member, e.g., 60 (FIG. 5). Apertures 42, 44 extend through the top wall 38 and are coaxially aligned with shank apertures 46, 48 that extend through the base 24, allowing passage of a screw or bolt to extend there through to secure the shear block 20 to a structural member, e.g., 60. A wire channel 50 in the base 24 allows wires to pass between the shear block 20 and a surface on which the shear block 20 is mounted, e.g., a structural member 60. The tabs 26, 28 have reliefs 52, 54 on at least one edge, allowing the shear block to be rotated into position, as described below. As shown in FIG. 5, the shear block 20 may be rotated relative to the structural member 60, such that tabs 26, 28 engage the retainer walls/tracks 72, 76 on the structural member 60 and outer surfaces 25, 27 of the tabs 26, 28 abut against constraining walls 29, 31 that define the recesses 80, 86 between the retainer walls 72, 76 and the web 66 (see FIG. 8). These mechanical interactions are explained further below. FIG. 3 shows the shear block 20 has a length L1 a width W1 and a thickness T1.

FIGS. 7 and 8 show a structural member 60 which may be oriented in any given orientation, e.g., vertically (as shown) or horizontally (See FIG. 14) and may function as a mullion in a window system, e.g., in a curtain wall. The structural member 60 has a pair of side caps 62, 64 conjoined to a pair of opposed webs 66, 68 with a space 70 between the webs 66, 68. Retainer walls 72, 74, 76, 78 extend from the side caps 62, 64 along the length of the structural member 60, forming opposing pairs 72, 76 and 74, 78. The retainer walls 72, 74, 76, 78 are spaced from the webs 66, 68 by recesses 80, 82, 84, 86 defined by walls 80W, 82W, 84W, 86W. The retainer walls 72, 74, 76, 78 may have tapered ends 72E, 74E, 76E, 78E that serve as lead-in surfaces for resilient legs 130A, 130B of a cover 130 (See FIGS. 22 and 23) that clip over the internal edges of the tapered ends 72E, 74E, 76E, 78E. Two shallow, "squared"/angular C-shapes C1, C2 are defined in cross-section by web 66 and walls 80W and 86W and by web 68 and walls 82W and 84W. Retainer walls 72, 76 extend from the ends of C-shape C1 and retainer walls 74, 78 extend from the ends of C-shape C2. The C-shapes C1, C2 are held in spaced relationship by caps 62, 64 that bridge the C-shapes, yielding a structural member 60 with a generally I-shaped cross-sectional shape. In an alternative to that shown, the caps 62, 64 may be flat plates that abut the upper and lower portions of the C-shapes C1, C2. A glazing panel support tongue 88 extends from the cap 64 along the length of the support member 60 and functions as a lip upon which a glazing panel (not shown) may rest, as well as an attachment structure for a cover element (not shown) for covering the edge of the glazing panel. The structural member 60 has a plurality of strengthening ribs 89, which contribute to the rigidity and strength of the structural member 60. Gasket recesses 90, 92 are provided to receive gaskets (not shown) that may aid in forming a seal with a glazing unit (not shown). As shown, the structural member may be formed as a monolith, e.g., as an aluminum alloy extrusion. The structural member 60 has a length L2, a width W2 and a thickness T2.

FIGS. 9-16 show steps that may be used to assemble a structure 200 (FIG. 16) having structural members 60V and 60H assembled at right angles. In FIG. 9, a shear block 20 having the attributes shown in FIGS. 3-6 is positioned with the tabs 26, 28 proximate a vertically oriented structural member 60V having the attributes shown in FIGS. 7 and 8. The tabs 28, 26 are oriented up and down, allowing insertion between retainer walls 72, 76 and placement against web 66. The web 66 has a pair of holes 100 (only one visible in FIG. 9) that may be used to receive and retain screws 102, 104 (FIG. 12). FIG. 10 shows the shear block 20 being rotated counterclockwise such that the tabs 26, 28 slip behind the retainer walls 72, 76, the retainer walls 72, 76 being received within the recesses 30, 32 (See FIG. 4). The reliefs 52, 54 (FIG. 5) on the tabs 26, 28 facilitate rotation of the shear block 20, allowing a close fit of the shear block 20 within the constraining walls 29, 31 (FIG. 5), with the outer surfaces 25, 27 of the tabs 26, 28 abutting against the constraining walls 29, 31. This positions the shear block 20 at a preselected orientation, e.g., perpendicular to the length of structural member 60V and prevents further rotation. This occurs when the shear block 20 is rotated to a horizontal orientation with the tabs 26, 28 extending right and left. This could be described as a "twist and lock" relationship. In an alternative method of assembly, the shear block 20 may be held in an orientation approximately perpendicular to the structural member 60V and then the tabs 26, 28 inserted into the slot formed by opposing retainer walls, e.g., 72, 76 and spaced web 66, at one of the ends 60VE1, 60VE2 (FIG. 9) of the structural member 60V. The shear block 20 may then be slid along the structural member 60V to a selected position along its length and then secured at that position by threaded fasteners. This second approach could be described as a "sliding" interaction for assembling the shear block 20 to the structural member 60V.

FIG. 11 shows the shear block 20 in a horizontal position, which corresponds to the position also shown in FIG. 5.

FIG. 12 shows that the horizontal position of the shear block in FIG. 11 may also allow the holes 100 (FIGS. 9 and 10) to align with the apertures 42, 44, 46, 48 allowing the passage of fasteners, e.g., screws 102, 104 there through for insertion into and attachment to holes 100 in the structural member 60V. When secured in the position shown in FIG. 13, the shear block 20 resists rotation, in particular, in a counterclockwise direction, due to fasteners 102, 104, but also due to the abutment of surfaces 25 and 27 with the constraining walls 29, 31, as shown in FIG. 5.

FIG. 14 shows a structural member 60H having attributes like structural member 60 shown in FIGS. 7 and 8 being slipped over the mounted shear block 20. The mounted shear block 20 is sized and shaped to be slidably received in the hollow space 70 of the structural member 60H, such that apertures 103, 105 align with fastener apertures 40 (FIG. 4).

As shown in FIG. 15, screws 106, 108 may be inserted through apertures 103, 105 to secure the structural member 60H to the shear block 20, forming assembly 200 depicted in FIG. 16. Because the horizontal structural member 60H is attached to the shear block 20 with screws 106, 108 in the upper surface, behind an installed glazing panel (not shown)

that sits on tongue 88, rather than through the front face of the mullion as in the traditional designs, the screws 106, 108 are interior to the glazing panel and weather penetration from the exterior E toward the interior I is avoided.

FIG. 17 shows a first wire 120 extending along the structural member 60V parallel to the web 66 between retainer walls 72, 76 and inserted though wire channel 50 of the shear block 20. Since the web 66 is recessed relative to the retainer walls 72, 76, the wire 120 may readily pass between the web 66 and the abutting end 60HE of the structural member 60H. The glazing support tongues 88H and 88V define a mounting recess for a glazing panel (not shown).

FIG. 18 illustrates how a second wire 122 may be routed parallel to the first wire 120 through wire channel 50 and then diverge to run parallel to web 66H of structural member 60H between retainer walls 72H and 76H. In this manner, the assembly 200 supports the routing of wiring in both the vertical and horizontal directions to convey electricity to any given location on the assembly 200, which, in the case of an assembly constituting a curtain wall, implies direct wiring access to the entire façade of a building. This type of wire management is compatible with "intelligent" building facades incorporating electrical devices and promotes ease of wiring without the need to "fish"/push/pull wiring through inaccessible cavities and reduces or eliminates the need to drill holes through structural members to allow wiring to pass through structural members. Minimizing hole drilling in a curtain wall for wire routing preserves structural integrity and weather-tightness of the curtain wall. As described below, the wiring may be concealed by removable/replaceable covers allowing wire access for changes and maintenance. The wiring may be routed prior to completion of the curtain wall or optionally, after assembly of the curtain wall.

FIGS. 19 and 20 show covers 130 and 140 that may be made from extruded plastic or metal and snap fit or fastened in place by screws or other fasteners to cover the wires 120, 122. The covers, 130, 140 provide a finished aesthetic appearance, as well as protecting the wiring 120, 122 from deterioration or unauthorized contact. In one alternative, the covers 130, 140 may be removably attached to the structural members 60H, 60V, allowing access to the wires 120, 122 for changes and maintenance. The covers 130, 140 also cover any holes 100 made in the structural members 60 V (See FIG. 9) in the event that the hole 100 is not used, e.g., if the original attachment point of the shear block 20 is moved to modify an original placement.

FIG. 21 shows an assembly 200 like that described above, supporting a mounting bracket 300, for supporting a given device, such as a light shelf, solar panel, antenna, etc. that is to be fastened to a window system, such as a curtain wall. The mounting bracket 300, has tabs 302, 304 (see FIG. 24) like tabs 26, 28 of the shear block 20 that similarly engage the retainer walls 72, 76 of structural member 60V. Accordingly, the retainer walls 72, 76 perform two functions, namely, interacting with shear blocks 20 and interacting with mounting bracket 300. The mounting bracket 300 may be assembled to the structural member by either the twist and lock approach or the sliding approach. The twist and lock approach allows a mounting bracket 300 to be installed on an existing, assembled structure 200, whereas the sliding approach implies assembling the bracket to the structural member 60V while an end 60VE of the structural element 60V remains open and unobstructed. Apertures 306, 308 may be used to insert fasteners through the mounting bracket 300 to fasten it to the structural member 60 V. A plurality of apertures 310 may be provided to receive fasteners to secure a device like a light shelf (not shown) to the mounting bracket 300. As in FIG. 5, the mounting bracket tabs 302, 304 may feature surfaces like 25 and 27 that prevent rotation in a given direction of the mounting bracket, e.g., counter-clockwise, to resist twisting of the mounting bracket 300 in the load direction L.

The weight (load L) of any device installed on the bracket, is supported by a structural member 60H that the bracket 300 rests upon, but need not rest on a structural member 60H. The weight also eccentrically loads the bracket 300 causing the bracket 300 to lock more firmly in place against the retainer walls 72, 76 and surfaces 25, 27. Screws (not shown) extending through apertures 306, 308 may also be used to attach the bracket to the structure 60V. This is in contrast to traditional mounting brackets that are attached by screws that thread into the front face of a structural member like 60V or 60H. The locking feature of the bracket 300 allows the bracket 300 to support more weight than traditional brackets. As described above relative to FIGS. 19 and 20, concealment caps 130, 140 can be applied after the installation of the bracket 300 on the structural member 60V. The bracket 300 can be used to support light shelves, blinds or any other devices that are attached on the inside of a curtain wall. Optionally, two brackets 300 can be installed on a single structural member 60V (one on each lateral side). This is in contrast to the common current practices of use of a single support bracket flush mounted on the front face of a mullion.

FIGS. 22 and 23 show cover 130, which features a pair of legs 130A, 130B, each of which may be provided with a barb 130 with a lead-in surface and a grasping ledge for grasping retainer walls 72, 76 (FIG. 8). The legs may extend the entire length of the cover or less than the entire length.

FIG. 24 shows mounting bracket 300 in isolation from structural members 60V and 60H (FIG. 21). As noted above, the mounting bracket 300 has tabs 302, 304 that engage the retainer walls 72, 76 (FIG. 8) of structural member 60V. Apertures 306, 308 may be used to insert fasteners through the mounting bracket 300 to fasten it to the structural member 60 V. A plurality of apertures 310 may be provided to receive fasteners to secure a device like a light shelf (not shown) to the mounting bracket 300.

A curtain wall may be made using the principles of assembly utilized in forming assembly 200 (FIGS. 16-21), which may be executed repeatedly using a selected plurality of structural elements 60 and shear blocks 20 to generate a grid structure of a selected size for supporting a selected number of glazing panels. The teachings of the present disclosure may be used to form a curtain wall that features an anti-rolling shear block and that allows easy wiring to and from the attached electrical elements. The wiring can be done before or after assembly of the curtain wall and produces an installation where the wire is fully concealed. The present disclosure reveals structures and methods facilitating ease of wiring at the joints between the horizontal and vertical structural elements/mullions. In addition, wiring changes after installation and concealment of the wire and mistaken mounting holes are facilitated. The shear block arrangement disclosed provides a strong attachment that resists twisting of the structural elements. Mounting brackets having attachment features similar to those of the shear blocks 20 have similar beneficial attributes. Mounting brackets attached to curtain walls in accordance with the present disclosure attach to the side of structural elements (mullions) rather than on the face of the mullions, which implies reliance on fastener pull-out strength rather than the self-locking mechanism of the present disclosure.

It will be understood that the embodiments described herein are merely exemplary and that a person skilled in the art may make many variations and modifications without departing from the spirit and scope of the claimed subject matter. All such variations and modifications are intended to be included within the scope of the disclosure.

We claim:

1. A structure, comprising:
   a first member having a portion with a C-shaped cross-sectional shape and a pair of retainer walls, a first of the pair of retainer walls attached at a first end of the C-shaped portion and extending at an angle relative thereto, a second of the pair of retainer walls attached at a second end of the C-shaped portion and extending at an angle relative thereto, the pair of retainer walls extending in a direction toward one another;
   a shear block with a base portion having a pair of tabs extending therefrom in opposite directions, the tabs separated from a remainder of the base portion by reliefs, a connector portion extending from the base portion distal to the pair of tabs in a direction perpendicular to the tabs, each relief accommodating a corresponding retainer wall of the pair of retainer walls, capturing the corresponding retainer wall between the tab and the remainder of the base portion with the tabs extending in a direction parallel to an intermediate portion of the C-shaped portion between the first end and the second end thereof and positioned between the intermediate portion and the retainer wall, coupling the shear block to the first member;
   a second member having a hollow therein, the connector portion of the shear block matingly received in the hollow.

2. The structure of claim 1, wherein the second member has a glazing support tongue extending from an exterior surface of the second member, the structure supporting at least one glazing panel.

3. The structure of claim 1, further comprising a plurality of first members, a plurality of second members and a plurality of shear blocks, the first members and second members being mullions for a window system.

4. The structure of claim 1, wherein the shear block is fastened to the first member by fasteners.

5. The structure of claim 4, wherein the shear block is fastened to the second member by fasteners extending through the second member into the shear block.

6. The structure of claim 1, wherein the shear block has a first rotational position with the shear block inserted into the C-shape of the first member with the tabs proximate the intermediate portion and with the retainer walls outside the recesses and a second rotational position rotationally offset relative to the first rotational position with the retainer walls inserted into the reliefs, and wherein at least one of the tabs abuts against a portion of the C cross-sectional shape in the second rotational position, preventing further rotation.

7. The structure of claim 6, wherein each of the tabs is relieved on at least one leading edge thereof, as defined by the direction of rotation in going from the first rotational position to the second rotational position.

8. The structure of claim 6, wherein the first member has a length, a width and a thickness, the length dimension having a vertical component, the shear block having a width, a thickness and a length, the length direction of the shear block extending away from the first member, the width of the shear block having a horizontal component and the second rotational position is with the width dimension of the shear block at about 90 degrees relative to the length of the first member.

9. The structure of claim 8, wherein the first member is approximately vertical and the second member is approximately horizontal.

10. The structure of claim 1, wherein the base portion of the shear block abuts against the first member at an intermediate portion of the C-shape, the base portion having a channel between the tabs defining a passage between the shear block and the intermediate portion.

11. The structure of claim 10, further comprising a wire extending through the channel.

12. The structure of claim 1, wherein the connector portion is hollow having a pair of side walls extending from the base portion to a top wall distal to the base portion.

13. The structure of claim 12, wherein the connector portion has at least one intermediate wall positioned between the side walls and extending the full length between the base portion and the top wall.

14. The structure of claim 1, wherein the first member has a pair of oppositely directed C-shaped portions.

15. The structure of claim 14, wherein the oppositely directed C-shaped portions of the first member are spaced apart and further comprising a first cap connected to a first end of each C-shape, bridging the spaced C-shapes and a second cap connected to a second end of each C-shape, bridging the spaced C-shapes, forming a fully enclosed hollow I-shaped structure in cross-section.

16. The structure of claim 15, wherein the hollow I-shaped structure has at least one internal strengthening rib positioned within the hollow thereof.

17. The structure of claim 15, wherein the cross-sectional shape of the second member is the same as the cross-sectional shape of the first member.

18. The structure of claim 17, wherein the I-shaped structure has at least two internal strengthening ribs defining the shape of the hollow that matingly receives the connector portion of the shear block.

19. The structure of claim 17, further comprising an electrical conductor element extending through at least one of the C-shapes in at least one of the first or second members.

20. The structure of claim 19, wherein the electrical conductor element extends through the C-shapes of both the first and second members without passing through an aperture in either the first member or the second member.

21. The structure of claim 1, wherein the cross-sectional shape of the second member approximates the cross-sectional shape of the first member and further comprising a cover bridging the corresponding C-shape and removably attached to at least one of the first or second members.

22. The structure of claim 21, wherein the cover has at least one resilient leg that grips the first or second member to establish a snap fit.

23. A structure, comprising:
   a first member having a portion with a C-shaped cross-sectional shape and a pair of retainer walls, a first of the pair of retainer walls attached at a first end of the C-shaped portion and extending at an angle relative thereto, a second of the pair of retainer walls attached at a second end of the C-shaped portion and extending at an angle relative thereto;
   a shear block with a base portion having a pair of opposed tabs extending therefrom, the tabs separated from a remainder of the base portion by reliefs, a connector portion extending from the base portion, each relief accommodating a corresponding retainer wall of the pair of retainer walls, capturing the corresponding retainer wall between the tab and the remainder of the base portion, coupling the shear block to the first member;

a second member having a hollow therein, the connector portion of the shear block matingly received in the hollow;

a mounting bracket with a base portion having a pair of opposed tabs extending therefrom, the tabs separated from a remainder of the base portion by reliefs, and a bracket portion extending from the base portion, each relief of the mounting bracket accommodating a corresponding retainer wall of the pair of retainer walls, capturing the corresponding retainer wall between the tab thereof and the remainder of the base portion thereof, coupling the mounting bracket to the first member.

24. The structure of claim 23, wherein the retainer walls of the first member extend toward one another and the shear block is fastened to the first member by fasteners and wherein at least one of the tabs of the mounting bracket base portion abut against a portion of the C cross-sectional shape when the shear block is rotated to a selected position relative to the first member, preventing further rotation.

25. A structure comprising:

a first member and a second member each having a pair of oppositely directed C-shaped portions having a C-shaped cross-sectional shape and a pair of retainer walls, a first of the pair of retainer walls attached at a first end of each C-shaped portion and extending at an angle relative thereto, a second of the pair of retainer walls attached at a second end of each C-shaped portion and extending at an angle relative thereto, the retainer walls extending toward one another, the oppositely directed C-shaped portions of the first member being spaced apart with a first cap structure connected to a first end of each C-shape, bridging the spaced C-shapes and a second cap structure connected to a second end of each C-shape, bridging the spaced C-shapes, forming a hollow I-shaped structure in cross-section, each of the first member and the second member having a glazing support tongue, the structure supporting at least one glazing panel;

a shear block with a base portion having a pair of opposed tabs extending therefrom in opposite directions, the tabs separated from a remainder of the base portion by reliefs, a connector portion extending from the base portion distal to the pair of tabs and in a direction perpendicular to the tabs, each relief accommodating a corresponding retainer wall of the pair of retainer walls, capturing the corresponding retainer wall between the tab and the remainder of the base portion with the tabs extending in a direction parallel to an intermediate portion of the C-shaped portion between the first end and the second end thereof and positioned between the intermediate portion and the retainer wall, coupling the shear block to the first member, the shear block fastened to the first member by fasteners, the hollow of the second member receiving the connector portion of the shear block matingly therein, the shear block fastened to the second member by fasteners extending through the second member into the shear block.

26. The structure of claim 25, further comprising an electrical wire passing through one of the C-shaped portions and a cover bridging one of the C-shaped portions removably attached to at least one of the first member or the second member.

27. The structure of claim 26, further comprising a plurality of first members, a plurality of second members and a plurality of shear blocks, the first members and second members forming mullions for a curtain wall window system.

* * * * *